(12) United States Patent
Ote et al.

(10) Patent No.: US 7,089,451 B2
(45) Date of Patent: Aug. 8, 2006

(54) COMPUTER MANAGEMENT SYSTEM

(75) Inventors: Ichiro Ote, Chigasaki (JP); Hiroshi Furukawa, Yokohama (JP); Hiroaki Washimi, Chigasaki (JP); Yuichi Kobayashi, Kawasaki (JP); Shigeru Sakurai, Zama (JP); Teiji Karasaki, Owariasahi (JP); Yuji Miyagawa, Owariasahi (JP); Masami Murai, Hadano (JP); Tsunehiro Tobita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 397 days.

(21) Appl. No.: 09/771,989

(22) Filed: Jan. 30, 2001

(65) Prior Publication Data

US 2001/0008021 A1 Jul. 12, 2001

Related U.S. Application Data

(63) Continuation of application No. 09/475,057, filed on Dec. 30, 1999, now Pat. No. 6,199,180, which is a continuation of application No. 09/144,174, filed on Aug. 31, 1998, now Pat. No. 6,044,476, which is a continuation of application No. 08/655,482, filed on May 30, 1996, now Pat. No. 5,815,652.

(30) Foreign Application Priority Data

May 31, 1995 (JP) .............................................. 7-133177

(51) Int. Cl.
*G06F 11/00* (2006.01)

(52) U.S. Cl. .............................. 714/31; 714/46; 714/30; 714/32; 714/39

(58) Field of Classification Search ................ 714/31, 714/30, 36, 46, 47, 25, 39, 14, 22; 364/280.3; 370/409; 359/110, 118
See application file for complete search history.

(56) References Cited

U.S. PATENT DOCUMENTS 5,204,955 A * 4/1993 Kagei et al. ................. 395/575

(Continued)

FOREIGN PATENT DOCUMENTS

JP          59105155       *  6/1984

(Continued)

OTHER PUBLICATIONS

"Transistor Technology Special", No. 9, CQ Publishing Co., pp 36–39 and 42–45.

(Continued)

*Primary Examiner*—Pierre E. Elisca
(74) *Attorney, Agent, or Firm*—Mattingly, Stanger, Malur & Brundidge, P.C.

(57) ABSTRACT

A computer management system attains, through one line, the uniform and steady system management through an agent such as monitoring of fault and power control in a computer connected by LAN as well as a public line, and system management for an off-state of the computer or abnormal operation state of the computer such as remote power control and notice and diagnosis of critical fault by the direct connection with a service processor through the line. The system includes an agent connected to a computer to be managed for executing instructions on the computer to be managed, a service processor board having a processor independent from the computer to be managed for monitoring fault in the computer to be managed and controlling power of the computer to be managed, a manager for executing instructions on a management computer and conducting controls such as fault monitoring and power control through the agent over a network including a public line, and a service processor manager directly connected to the service processor for conducting remote power-on and receiving and diagnosing critical fault. The service processor and the service processor manager are provided with switching circuits for switching an asynchronous interface for remotely connecting to the computer to be managed and an asynchronous interface for directly connecting to a local processor of the service processor.

12 Claims, 23 Drawing Sheets

U.S. PATENT DOCUMENTS

| | | | |
|---|---|---|---|
| 5,237,677 A | 8/1993 | Hirosawa et al. | 714/46 |
| 5,257,384 A | 10/1993 | Farrand et al. | 395/725 |
| 5,272,382 A | 12/1993 | Heald et al. | 307/66 |
| 5,283,905 A | 2/1994 | Saadeh et al. | 395/750 |
| 5,285,198 A | 2/1994 | Asahina | 340/825.16 |
| 5,309,563 A | 5/1994 | Farrand et al. | 395/200 |
| 5,367,635 A | 11/1994 | Bauer et al. | 395/200 |
| 5,367,667 A | 11/1994 | Wahlquist et al. | 395/183.07 |
| 5,367,670 A | 11/1994 | Ward et al. | 395/575 |
| 5,410,706 A | 4/1995 | Farrand et al. | 395/700 |
| 5,455,932 A | 10/1995 | Majur et al. | 395/184.01 |
| 5,465,349 A | 11/1995 | Geronimi et al. | 395/184.01 |
| 5,511,191 A | 4/1996 | Leeuw van Weenen | 394/184.01 |
| 5,515,418 A | 5/1996 | Yamaguchi et al. | 370/216 |
| 5,577,112 A | 11/1996 | Cambray et al. | 379/216 |
| 5,590,061 A * | 12/1996 | Hollowell, II et al. | 364/571.03 |
| 5,592,675 A | 1/1997 | Itoh et al. | 395/750 |
| 5,596,628 A | 1/1997 | Klein | 379/93 |
| 5,600,788 A | 2/1997 | Lofgren et al. | 395/183.07 |
| 5,603,038 A | 2/1997 | Crump et al. | 395/750 |
| 5,636,341 A | 6/1997 | Matsushita et al. | 395/183.01 |
| 5,652,892 A | 7/1997 | Ugajin | |
| 5,696,899 A * | 12/1997 | Kalwitz | 395/200.1 |
| 5,699,502 A | 12/1997 | Swanberg et al. | 714/708 |
| 5,781,434 A | 7/1998 | Tobita et al. | |
| 5,815,652 A * | 9/1998 | Ote et al. | 714/31 |
| 5,835,780 A | 11/1998 | Osaki et al. | 714/14 |
| 6,044,476 A | 3/2000 | Ote et al. | |

FOREIGN PATENT DOCUMENTS

| | | | |
|---|---|---|---|
| JP | 59170952 | | 9/1984 |
| JP | 1044520 | * | 2/1989 |
| JP | 6444520 | | 2/1989 |
| JP | 1260546 | | 10/1989 |
| JP | 05119875 | | 5/1993 |
| JP | 05189094 | | 7/1993 |
| JP | 05224782 | | 9/1993 |
| JP | 06028063 | | 2/1994 |
| JP | 06085867 | | 3/1994 |
| JP | 7115428 | | 5/1995 |
| JP | 07319833 | | 12/1995 |
| JP | 08115281 | | 5/1996 |
| JP | 08130546 | | 5/1996 |
| JP | 08205257 | | 8/1996 |
| JP | 08297590 | | 11/1996 |
| JP | 10011177 | | 1/1998 |
| JP | 05-224782 | | 9/2003 |

OTHER PUBLICATIONS

"EISA Specification", Version 3.12, pp. 292–293.

"Pentium Family User's Manual", vol. 1: Data Book, 1994, pp30-4 and 30-5.

"Intel Networking", Networking Components (82595TX Ethernet), 1995, pp1-8-1-11.

* cited by examiner

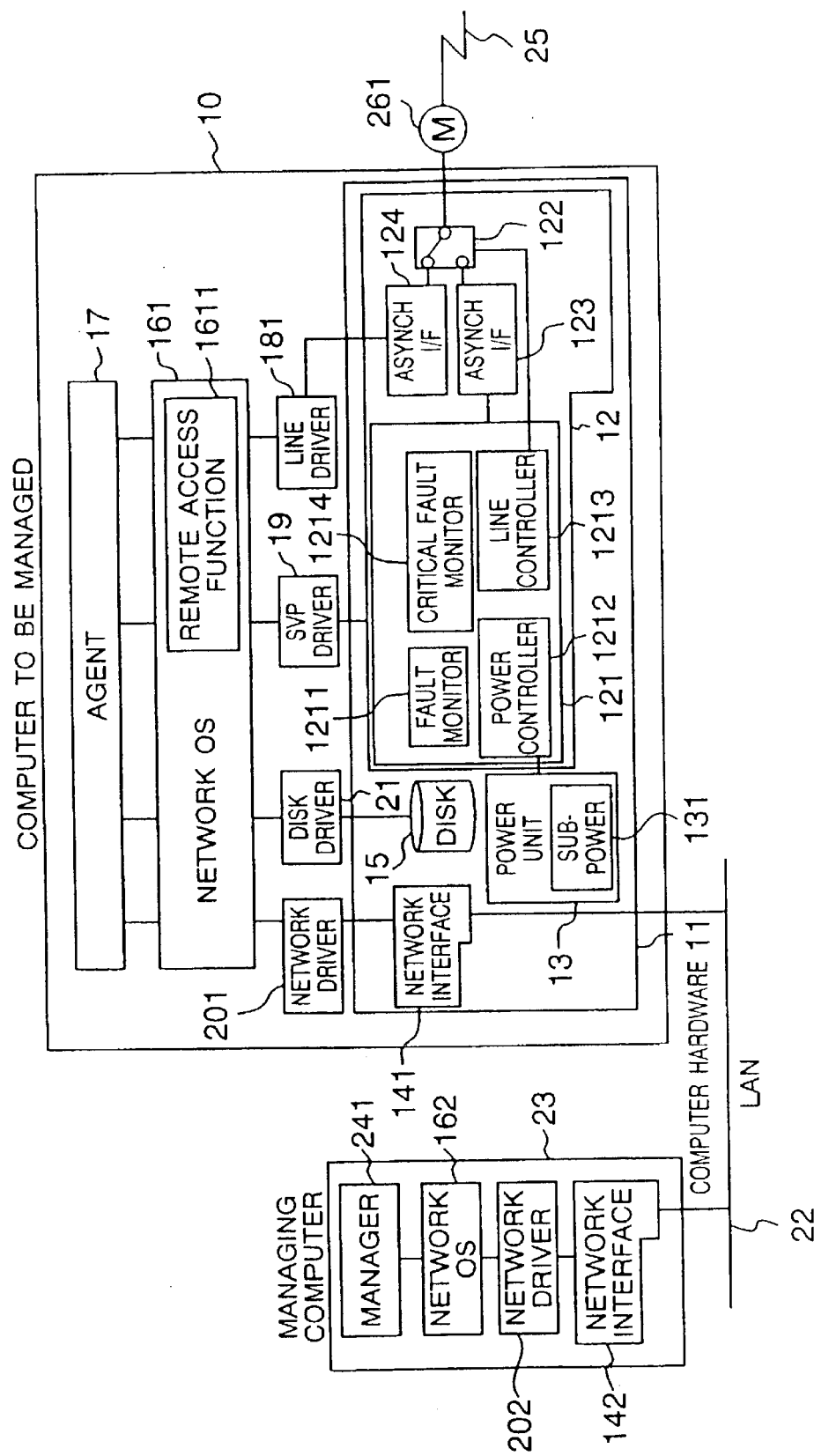

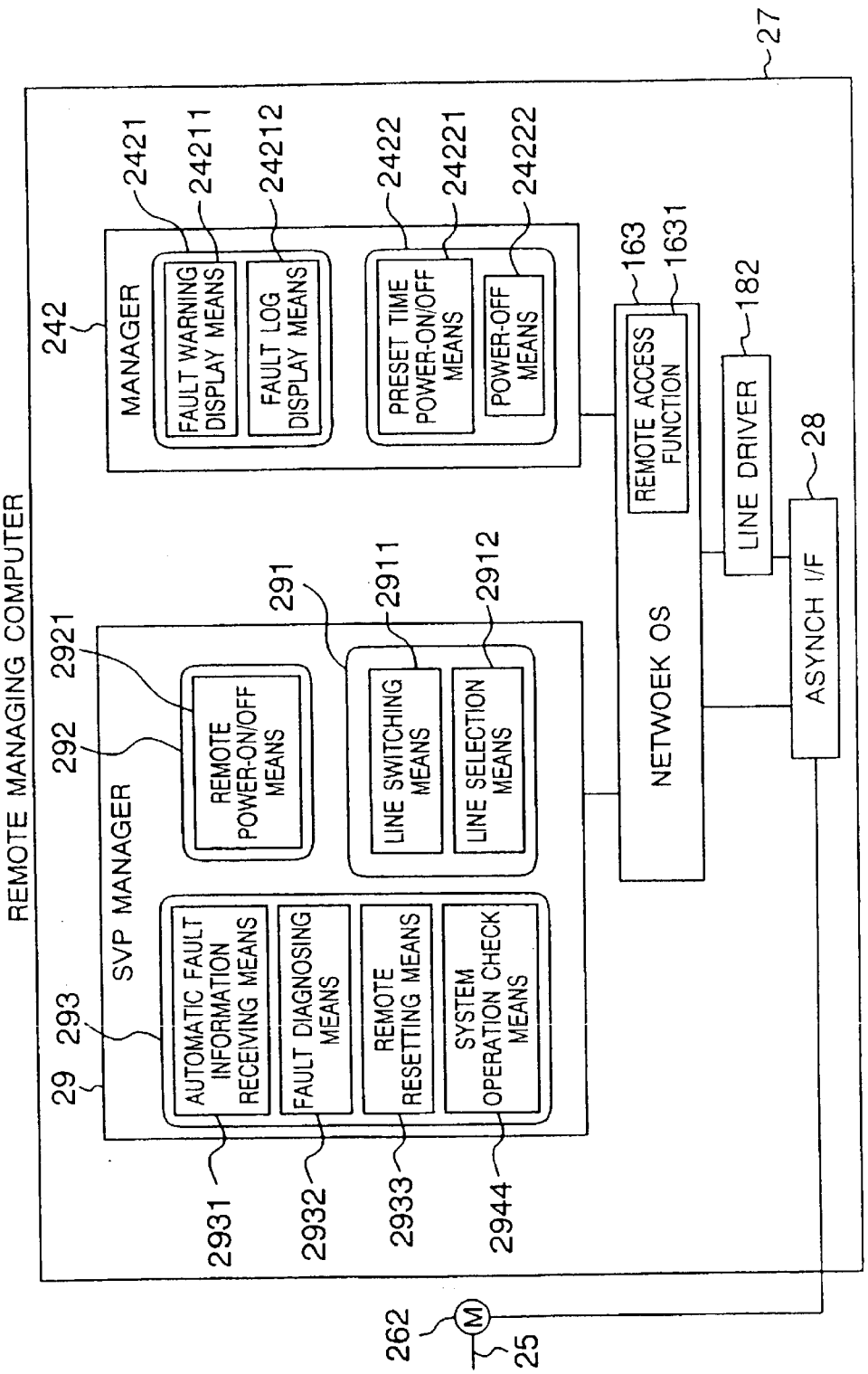

COMPUTER MANAGEMENT SYSTEM

CROSS-REFERENCE TO RELATED APPLICATION

This application is a continuation of application Ser. No. 09/475,057 filed Dec. 30, 1999, now U.S. Pat. No. 6,199,180 which in turn is a continuation of application Ser. No. 09/144,174 flied Aug. 31, 1998 (now U.S. Pat. No. 6,044, 476), which in turn is a continuation of application Ser. No. 08/655,482 filed May 30, 1996 (now U.S. Pat. No. 5,815, 652).

BACKGROUND OF THE INVENTION

The present invention relates to a management system (hereinafter referred to as a manager) for a computer system and more particularly to a manager for monitoring and controlling fault and performance of a plurality of computers on a network through the network in a client server system (hereinafter referred to as a CSS) in which a plurality of computers are connected by the network such as a local area network (hereinafter referred to as a LAN) or a public line.

As the performance of a personal computer and a workstation is enhanced, it has become popular to connect a plurality of computers through a LAN to construct a system. In the CSS, various types of operating systems (hereinafter referred to as network OSs) are mounted on computers functioning as clients or server and these computers are connected through the network to operate in a cooperative manner.

In such a CSS system, as a scale thereof expands, the number of computers functioning as the clients and servers extends to several hundreds to several thousands and when the network manages and operates the respective computers manually by the system operators, the loads of the system operators and the cost therefor increase, which causes a problem. In order to solve such a problem, a management system has been proposed in which a manager is mounted on at least one of the computers on the LAN and an agent for managing each computer in accordance with a direction by the manager is mounted in each of the servers to be managed connected to the LAN so that central management is attained by the manager through the network. Particularly, when a CSS system for a fundamental business of an enterprise is to be constructed, a high reliability is required for the server and a management system focused on fault management of the server is provided.

In such a system focused on the fault management, as disclosed in U.S. Pat. No. 5,367,670, a dedicated extended board for monitoring fault which mounts a processor independent from a main unit is connected to an extended interface of a computer main unit so that fault information collected by the extended board is received by the agent and it is sent to the manager of other management computer connected by the LAN through the network OS to manage the fault. Further, an asynchronous interface is mounted on the extended board so that such collected information may be acquired from the remote computer connected by a modem and a public line and the remote management computer is connected to the extended board via the modem and the public line and the fault is monitored by a dedicated manager. Such remote monitoring offers the advantage of continuous monitoring of fault because the monitoring of fault and the warning are conducted by a processor independent from the main unit on the extended board even if a critical fault which leads to non-operation of the network OS occurs on the computer to be managed (see prior art of FIG. 2).

On the other hand, as a recent trend of the network OS which provides the network environment of the CSS, in order to expand a range of connection of the network and an application area of the system by not only providing the network functions to a plurality of computers connected by the LAN but also connecting mobile computers and office computers, it has been proposed to achieve a remote access function which is totally equivalent to the computers connected by the LAN, between the remote computers connected by the modem and the public line as shown in FIG. 3 to provide a transparent network environment including the public line connection. From the application (AP) operating on the network OS, it is not necessary to know which of the LAN and the line the low order network is connected by, except a communication rate. An example of such network OS is the remote access service (RAS) performed in Windows NT (trade mark) of the Microsoft Inc. US, which is becoming a standard function of the future network OS. Accordingly, the management system for the LAN may be introduced to the line-connected remote computer and uniform management may be attained.

In the above prior art system which is focused on the fault monitoring, no attention is paid to the remote access function of the network OS. Thus, when the system management similar to that of the computer which is LAN-connected to the remote computer connected to the public line by utilizing the remote access function is to be conducted, a remote management computer for managing the system through the agent by utilizing the remote access function, a line and a modem for the connection thereof, a remote management computer directly connected to the fault monitoring extended board for management and a line and a modem for the connection thereof are required. Two management computers, two lines and two modems are required on the management computers and two lines and two modems are required on the computer to be managed. This may cause a problem in the operation. As to the prior art, reference is made to U.S. Pat. No. 5,367,670 to Ward et al and U.S. Pat. No. 5,410,706 to Ferrand et al.

SUMMARY OF THE INVENTION

The system management which is conducted by the manager of the remote management computer through the agent of the computer to be managed as it is in the LAN-connected system is suitable for the steady system management where the computer to be managed operates normally. On the other hand, when the system management is attained by connecting the modem and the line directly to the fault monitoring extended board, it is suitable for the system management in which a critical fault occurs in the computer to be managed and the agent cannot operate. Thus it is a system management method which is effective in different and exclusive situations. In light of the above, it is an object of the present invention to provide means to realize the remote system management by the above two methods by one remote management computer and one modem. Thus, the redundant remote management computer, line and modem which causes a problem in the operation is eliminated.

It is another object of the present invention to provide computer management method and system which attains the remote power control of the computer to be managed which could not be attained in the prior art from the manager connected by the LAN or the public line, provide an environment to centrally conduct the fault management from small fault of a plurality of computers to a critical fault leading to the system-down and the operation support such as the start and stop of the computer to be managed, from the manager connected by the LAN or the public line.

In order to achieve the above objects, in accordance with one aspect of the present invention, the agent which conducts the fault monitoring on the computer to be managed and the power control and the computer unit to be managed are controlled by independent processors. It provides the computer management system comprising the service processor board (hereinafter referred to as an SVP board) which is the extended board to monitor the fault and control the power supply in cooperation with the agent, the manager for managing the system connected to the agent through the network OS including the remote access function and operating on the management computer connected by the public line or the LAN and the SVP manager for controlling the SVP board connected directly to the SVP board by the public line.

On the SVP board, there are provided a switching circuit for selectively connecting one of an asynchronous interface connected to the processor of the SVP board and an asynchronous interface accessible from the computer to be managed to the modem connected to the line and switching control means. On the SVP board, there is provided line connection monitoring means for monitoring the connection status of the line after the line connection through the asynchronous interface accessible from the computer to be managed and switching the switching circuit of the asynchronous interface to the processor of the SVP board upon the disconnection of the line.

On the SVP board, there are also provided a power control circuit for controlling the ON/OFF of the power supply unit and control means therefor.

The SVP manger is provided with line switching means for sending the switch request of the switching circuit of the asynchronous interface in synchronism with the user operation.

In the power-off status of the computer to be managed, the switching circuit of the asynchronous interface of the SVP board is set to select the processor of the SVP board. The SVP board is always kept operative by a sub-power supply even when the power supply of the main unit is off. Accordingly, the SVP manager can always be directly connected to the SVP board so that the power-on request may be sent to the power control circuit of the SVP board to remotely turn on the power supply of the main unit.

In the normal operation state after the power-on of the computer to be managed, the switching circuit of the asynchronous interface is set to select the asynchronous interface accessible from the computer to be managed by the line switching means of the SVP manager. Thus, since the network OS can be connected by the remote access function of the management computer and the remote access function of the computer to be managed, the fault monitoring and the power control may be conducted remotely by the manager through the agent.

When the connection by the remote access function is disconnected by the line connection monitoring means or the connection is disconnected by the fault, the switching circuit of the asynchronous interface is set to select the processor of the SVP board. Accordingly, when a critical fault occurs in the computer to be managed and the network OS and the agent cannot operate, the SVP manager is remotely connected to the SVP mode directly to diagnose the fault and remotely reset.

Other objects, features and advantages of the present invention will become apparent from reading the following detailed description of the embodiments taken in conjunction with the accompanying drawings.

BRIEF DESCRIPTION OF THE DRAWINGS

FIGS. 1A and 1B collectively show a block diagram of one embodiment of the present invention.

DETAILED DESCRIPTION OF THE PREFERRED EMBODIMENTS

Figure 1B:
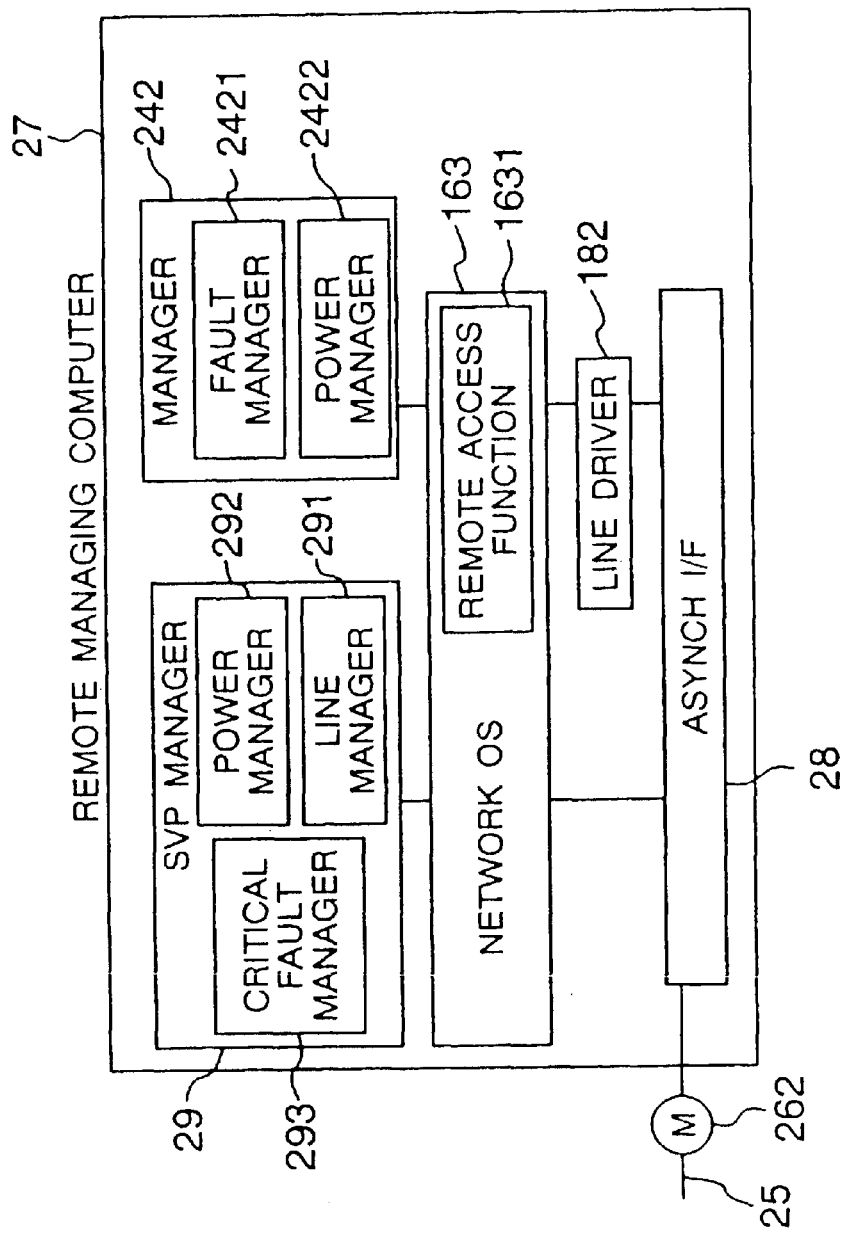
Figure 2:
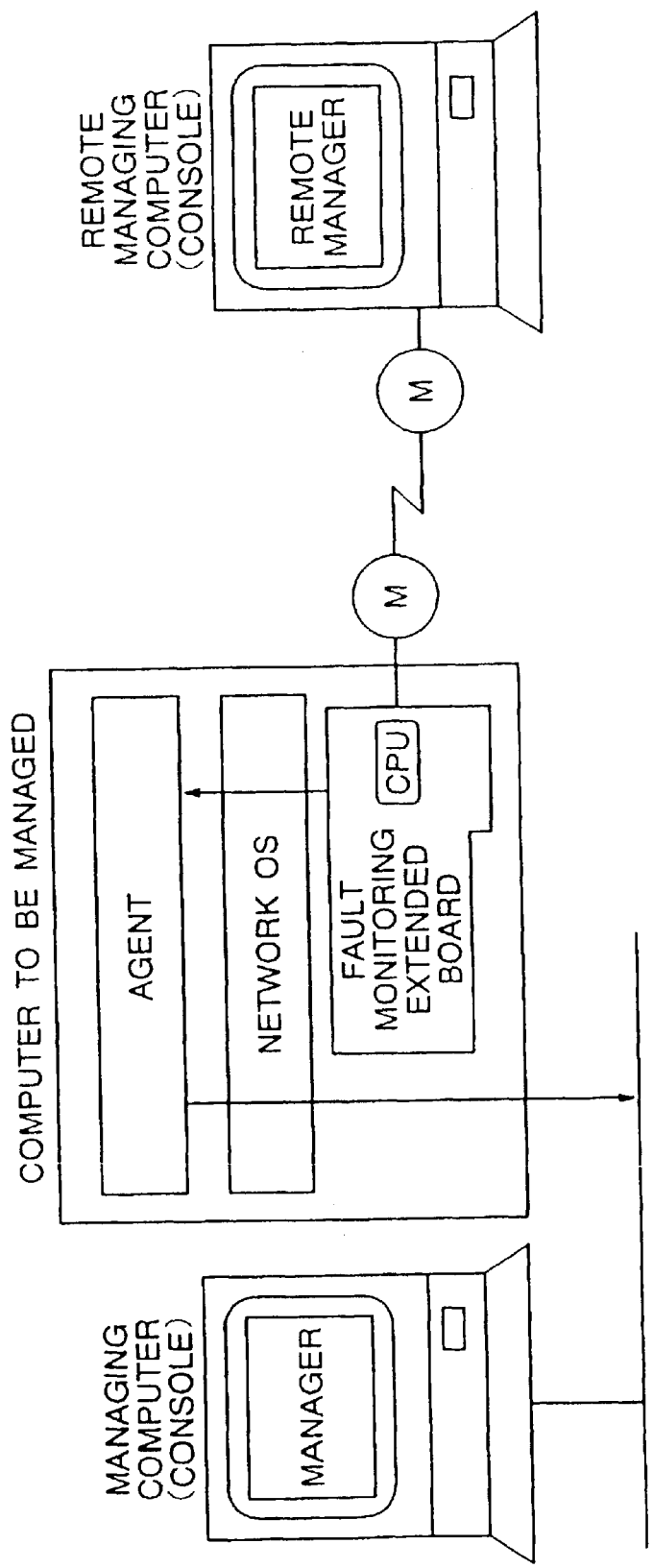
FIG. 2 shows a block diagram of a prior art system configuration.
Figure 3:
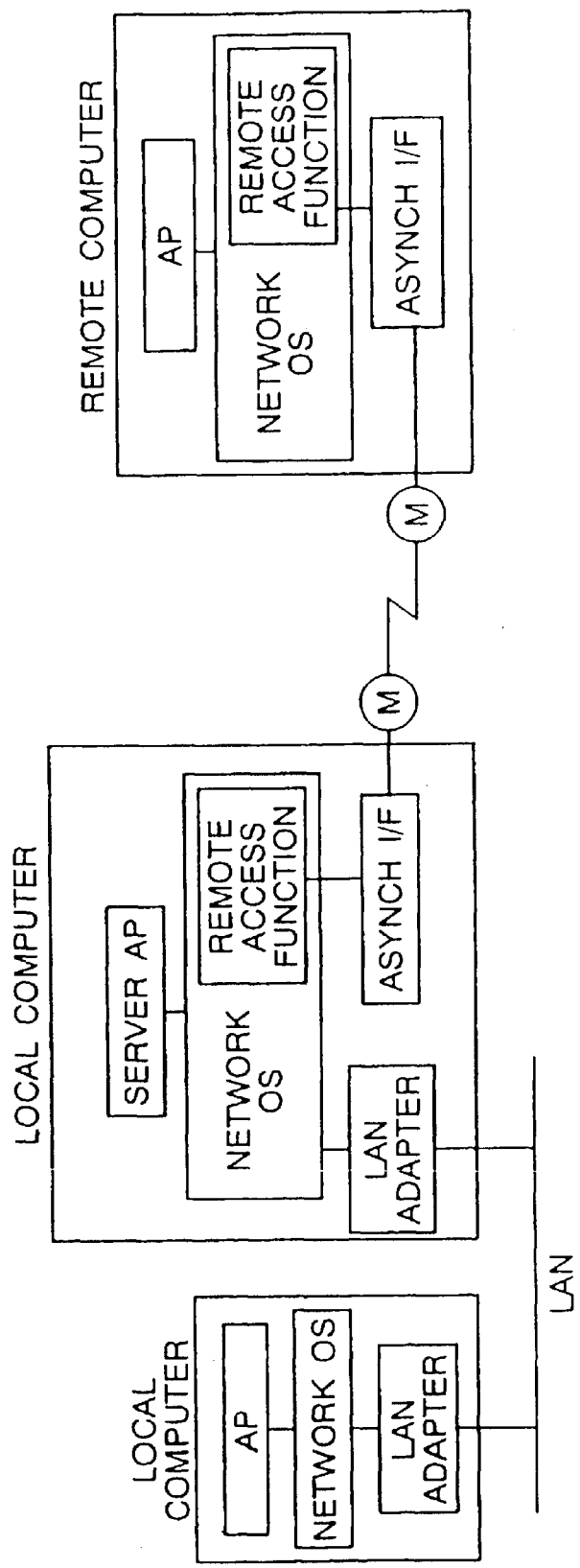
FIG. 3 shows a block diagram of a remote access function.
Figure 4:
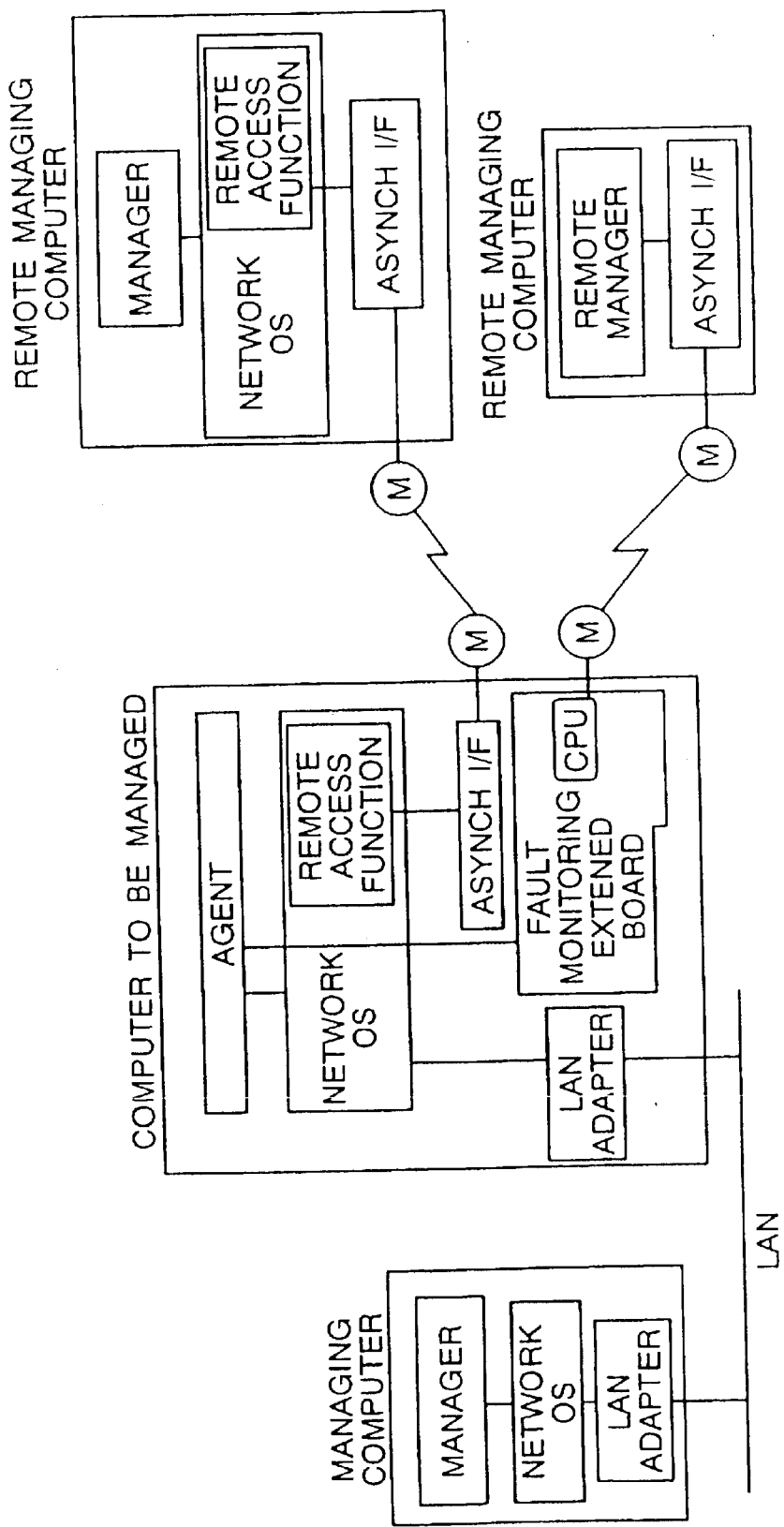
FIG. 4 shows a block diagram for illustrating a problem in the prior art, FIGS. 5A and 5B collectively show a block diagram of a detail of the embodiment.

FIGS. 1A and 1B show in a group a block diagram of one embodiment of the present invention. A configuration thereof is now explained.

Numeral 10 denotes a computer to be managed, numeral 11 denotes hardware of the computer to be managed, numeral 12 denotes an SVP board, numeral 121 denotes an SVP controller which is firmware for controlling by a processor of the SVP, numeral 122 denotes a switching circuit of an asynchronous interface, numeral 123 denotes an asynchronous interface (hereinafter referred to as an asynchronous I/F) connected to the processor of the SVP board, numeral 124 denotes an asynchronous I/F accessible by the computer 10 to be managed, numeral 13 denotes a power unit, numeral 131 denotes a sub-power supply for continuously supplying a power to the SVP board, numerals 141 and 142 denote LAN adapters, numeral 15 denotes a disk drive, numerals 161, 162 and 163 denote network OSs for conducting communication by the computers, numerals 1611 and 1631 denotes remote access functions for connecting the network OSs through a public line, numeral 17 denotes an agent for monitoring fault of the computer 10 to be managed and managing the power control, numerals 181 and 182 denote line drivers for enabling the remote access functions 1611 and 1631 to access the public line, respectively, numeral 19 denotes an SVP driver for exchanging data between the agent 17 and the SVP board 12, numerals 201 and 202 denote network drivers for controlling the network adapters 141 and 142, respectively, numeral 21 denotes a disk driver for driving the disk drive 15, numeral 22 denotes a LAN (local area network) for connecting the management computer and the computer to be managed, numeral 23 denotes the management computer connected to the computer to be managed through the LAN, numerals 241 and 242 denote managers connected to the agent via the network OSs 161, 162 and 163 for managing the computer 10 to be managed, numeral 25 denotes a public line for connecting the computer 10 to be managed or the SVP board 12 and a remote management computer 27, numerals 261 and 262 denote modems for connecting the line, numeral 28 denotes an asynchronous I/F for connecting the remote management computer 27 to the modems, and numeral 29 denotes an SVP manager directly connected to the SVP board for controlling the power-on/off and monitoring a critical fault.

The remote management computer 27 and the computer 10 to be managed are connected over the line 25, and it is totally equivalent to the management computer connected by the LAN 22 due to the remote access functions 1611 and 1631 although it is of lower speed, and a transparent network environment is provided. The manager 242 is a management unit used when it is connected to the computer 10 to be managed by the remote access functions, and it may be of identical configuration to that of the manager 241. By virtue of the remote access function, a transparent system management including the public line is attained.

A fault management 2421 of the manager 242 manages a steady fault which does not lead to a critical fault during the connection by the remote access function. The fault management 2421 is connected to the agent 17 by the remote access function 1611 from the remote access function 1631 via the line and manages the fault of the computer 10 to be managed through the agent 17. The power management 2422 also manages the power supply of the computer 10 to be managed through the agent 17.

The agent 17 receives fault information from the fault monitor 1211 of the SVP board 12 by the SVP driver 19 and requests the power-on/off to the power controller 1212.

On the other hand, when the power-off or the critical fault has occurred in the computer 10 to be managed, the network OS 161 is not operative and the connection from the manager 242 to the agent 17 through the remote access function is not attained. Even when the critical fault occurs in the computer to be managed, the SVP which is controlled by the independent processor continues to operate normally. Even when the power of the main unit is turned off, the SVP board 12 which is continuously powered by the sub-power supply 131 is operative.

Thus, it is the SVP manager 29 that is directly connected to the SVP board when the critical fault or the power-off occurs to manage the fault of the computer 10 to be managed and control the power. When the power of the main unit is off, the line controller 1213 sets the asynchronous I/F switching circuit 122 to select the asynchronous I/F 123. Thus, the SVP manager 29 may be connected to the line controller 1213 of the SVP board 12 by the line manager 291 through the line 25. After the connection, the SVP manager 29 sends a power-on request to the power controller 1212 of the SVP board 12 by the power manager 292 to turn on the power of the computer 10 to be managed.

When the critical fault occurs in the computer 10 to be managed, the critical fault monitor 1214 automatically dials by the line controller 1213 to inform the occurrence of the critical fault to the critical fault manager 293 of the SVP manager 29 through the line 25.

Figure 5A:
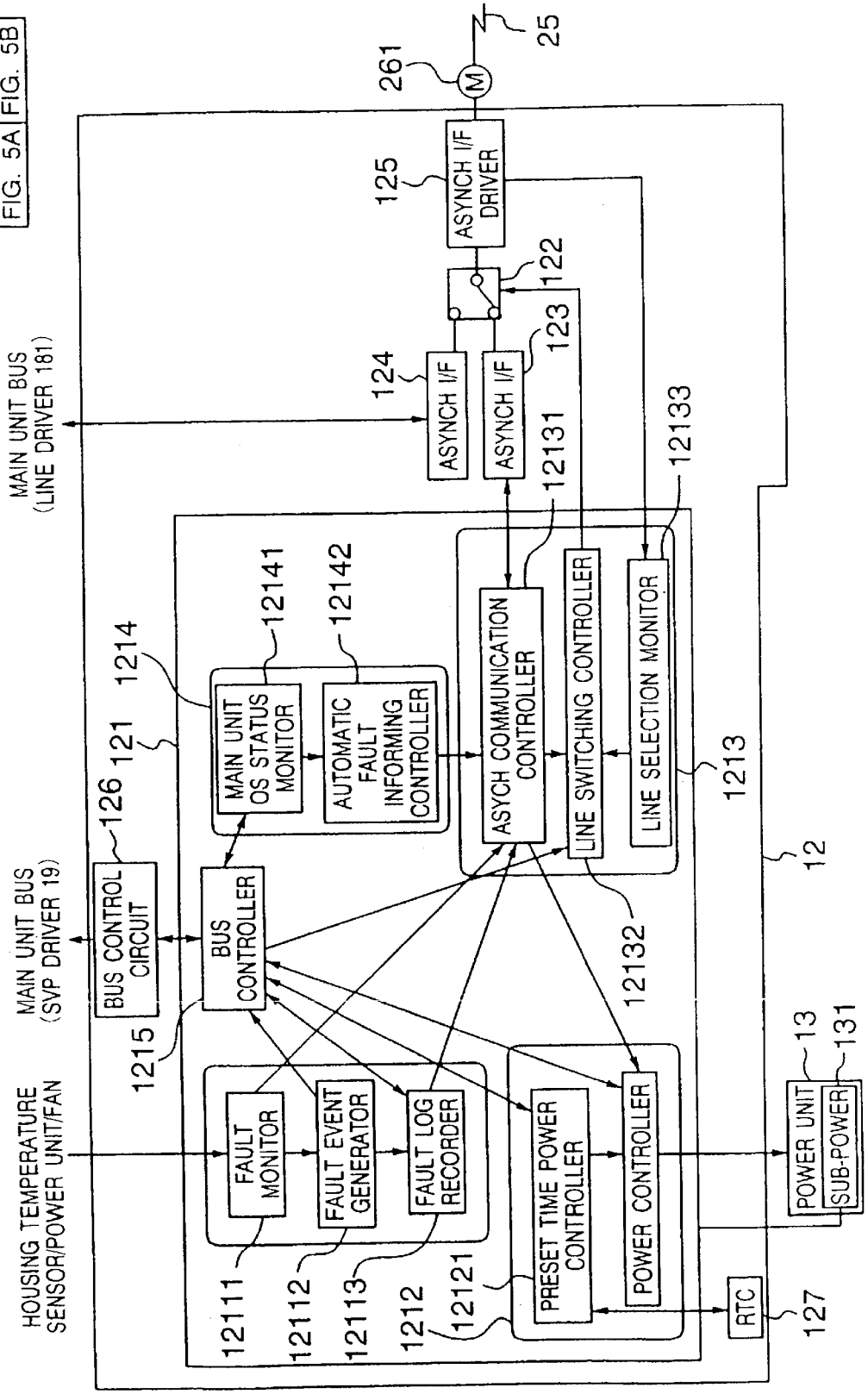

FIGS. 5A and 5B show in a group a detailed block diagram for illustrating configurations and a relation of the SVP board, the SVP manager and the manager. FIGS. 6 to 21 show flow charts of the operations of the respective control means. Referring to FIGS. 1, 5 and the flow charts of FIGS. 6 through 21, detailed controls of the embodiment are explained.

Figure 6:
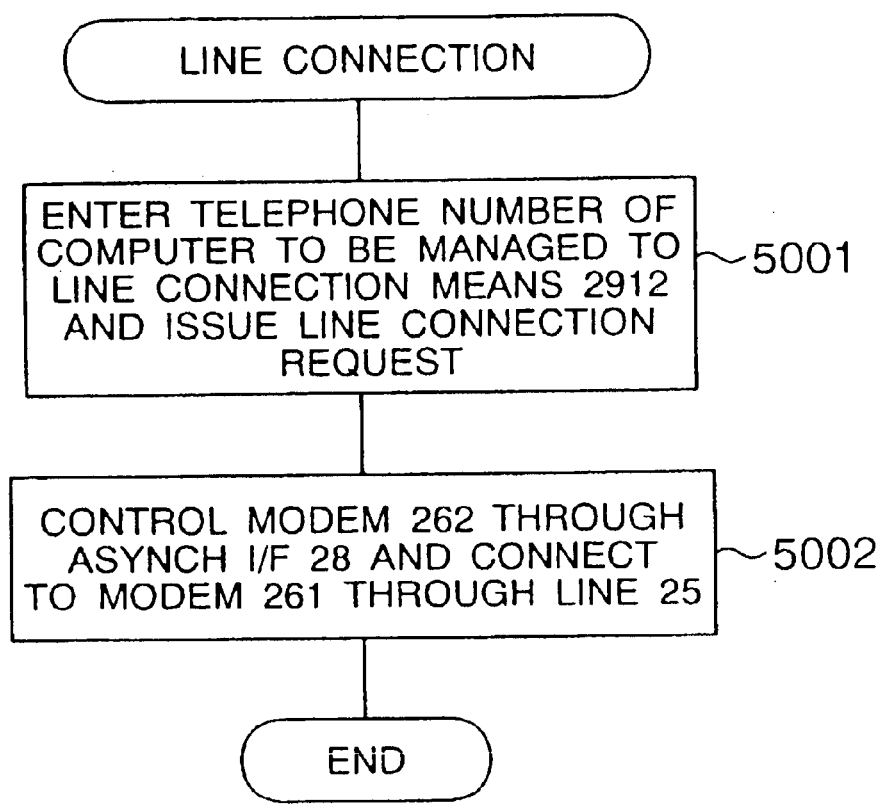
FIG. 6 shows a flow chart of a line connection procedure.
Figure 7:
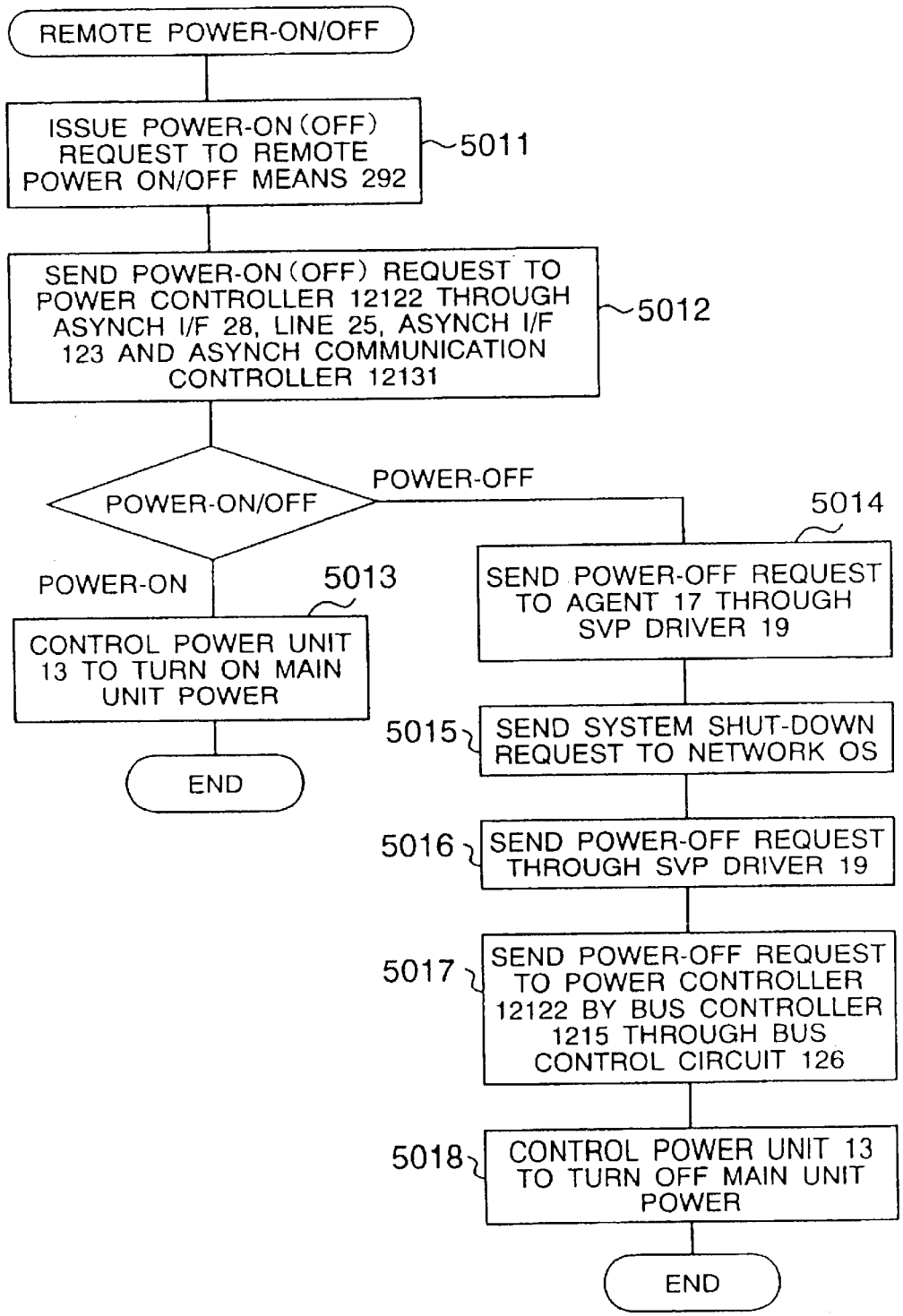
FIG. 7 shows a flow chart of a remote power ON/OFF procedure.

As shown in the flow chart of FIG. 6, a user first enters a telephone number of the computer 10 to be managed to the line connection means 2912 and a line connection request is sent from the SVP manager 29 to the SVP board 12 (step 5001). The line connection means 2912 controls the modem 262 through the asynchronous I/F 28 and connects the modem 261 to the line via the line 25 (step 5002). Thus, the communication from the SVP manager 29 to the SVP board through the asynchronous communication controller 1231 is established. In the following description, it is assumed that this line connection has already been established in any access from the SVP manager to the SVP board. The remote power-on/off is now explained. As shown in the flow chart of FIG. 7, the user issues a power-on or power-off request to the remote power-on/off means 292 (step 5011). The remote power-on/off means 292 sends the power-on or power-off request to the power controller 12122 through the asynchronous I/F 128, the line 25, the asynchronous I/F 123 and the asynchronous communication controller 12131 (hereinafter the same route is abbreviated as the line 25) (step 5012). For the power-on request, the power controller 12122 controls the power unit 13 to immediately turn on the power (step 5013). On the other hand, for the power-off request, the power controller 12122 temporarily sends the power-off request to the agent 17 through the SVP driver 19 (step 5014). The agent 17 issues a system shut-down request to the network OS 161, and after the system is shut down, sends the power-off request to the power controller 12122 of the SVP board 12 through the SVP driver 19. The power controller 12122 receives the power-off request and it now immediately controls the power unit 13 to turn off the power (steps 5015~5018).

Figure 8:
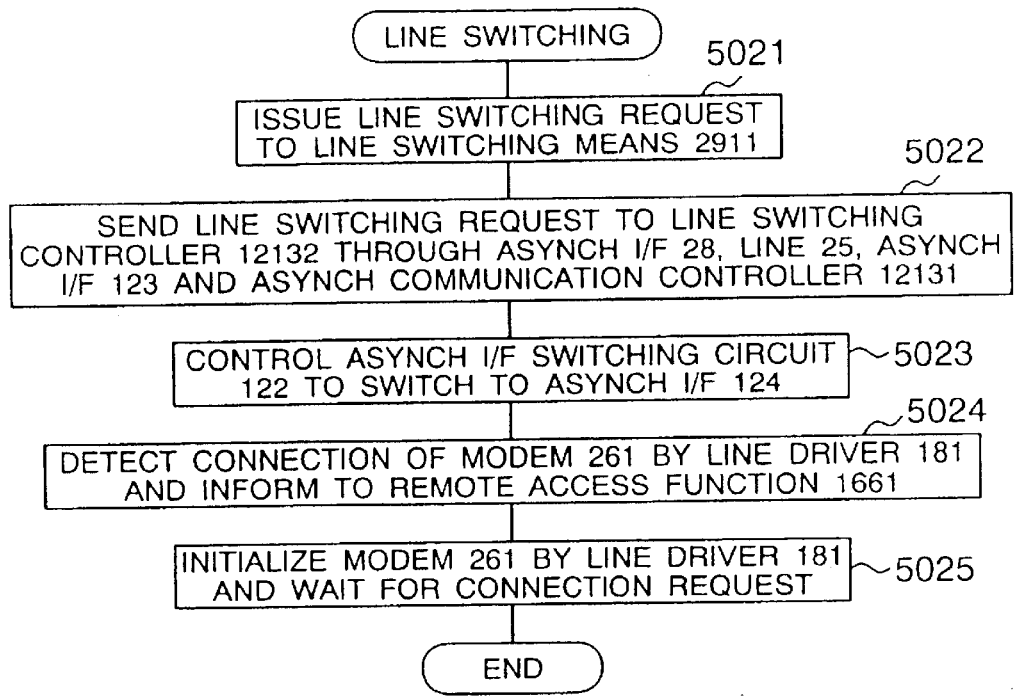
FIG. 8 shows a flow chart of a line switching procedure.

For the line switching, as shown in FIG. 8, the asynchronous interface switching circuit 22 connected to the SVP is switched to the main unit. The user issues a line switch request to the line switching means 2911 (step 5021). The line switching means 2911 sends the line switch request to the line switching controller 12132 through the line 25 (step 5022). The line switching controller 12132 controls the switching circuit 22 of the asynchronous interface 22 to switch the line to the asynchronous I/F 124 (step 5023). The line driver 181 detects the connection of the modem 261 and informs it to the remote access function 1661 (step 5024). The remote access function 1661 initializes the modem 261 by the line driver 181 and waits for the connection (step 5025).

Figure 9:
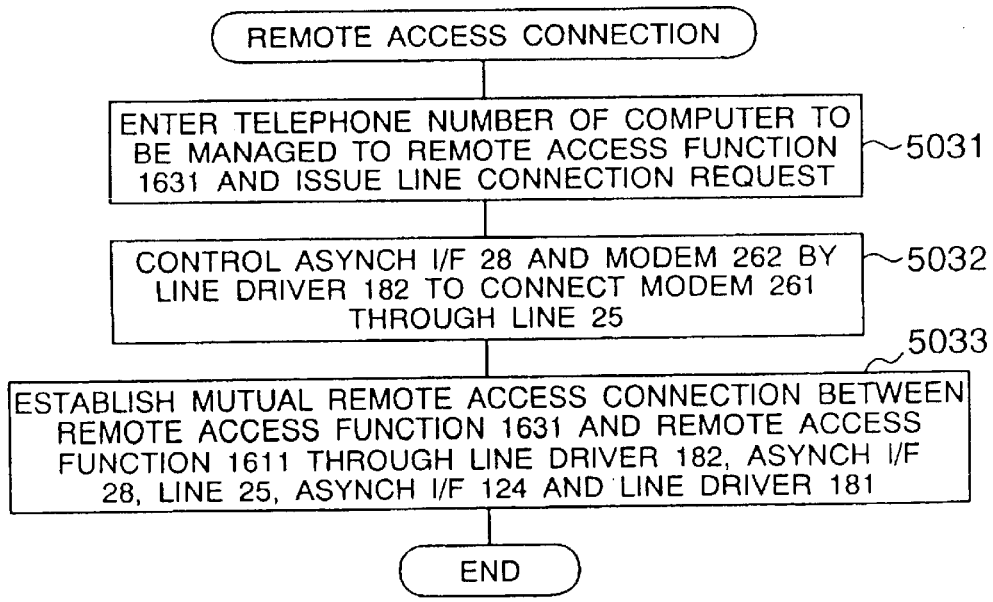
FIG. 9 shows a flow chart of a remote access procedure.

Since the connection by the remote access (remote access connection) is ready by the line switching, the remote access function connection is made as shown in FIG. 9. The user enters the telephone number of the computer 10 to be managed (the same number because the line and the modem are same) to the remote access function 1631 and issues a line connection request (step 5031). The remote access function 1631 controls the asynchronous I/F 28 and the modem 262 by the line driver 182 and connects the modem 261 to the line through the line 25 (step 5032). The remote access connection is established between the remote access function 1631 and the remote access function 1611 through the line driver 182, the asynchronous I/F 28, the line 25, the asynchronous I/F 124 and the line driver 181 (step 5033).

Figure 10:
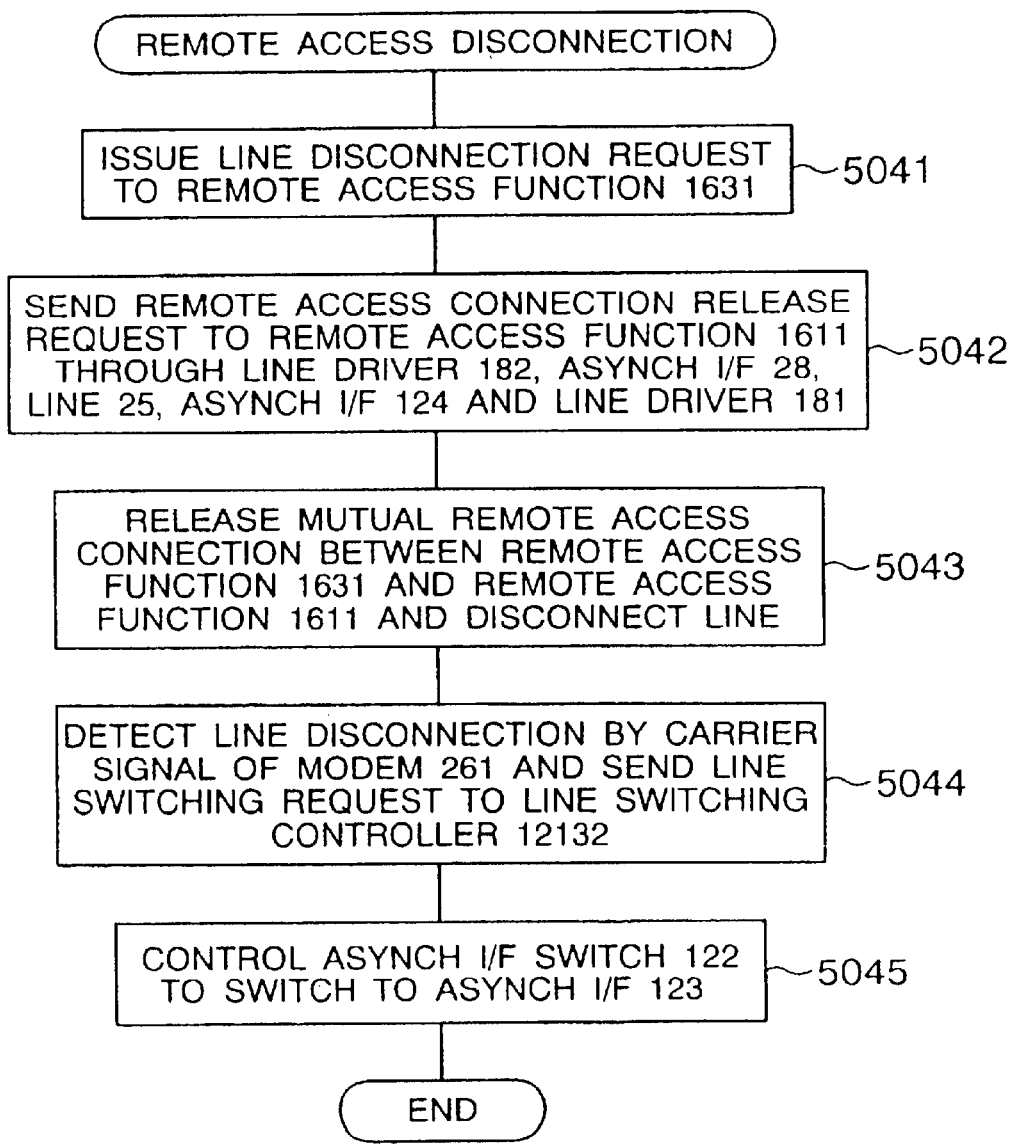
FIG. 10 shows a flow chart of a remote access disconnection procedure.

To disconnect the remote access connection, as shown in FIG. 10, the user issues a line disconnection request to the remote access function 1631 to release the connection with the remote access function 1631 and disconnect the connection (steps 5041~5043). Upon the establishment of the remote access connection, the line connection monitor 12133 monitors the line disconnection by the carrier signal of the modem 261 through the asynchronous I/F driver circuit 125 which connects the asynchronous I/F and the external modem. Thus, it detects the line disconnection and sends the line switch request to the line switching controller 12132 to switch the asynchronous I/F switch 122 to the asynchronous I/F 123 (steps 5044~5045). Thus, except when the remote access connection is made, the SVP manager 29 can always connect the line to the SVP board 12.

Figure 11:
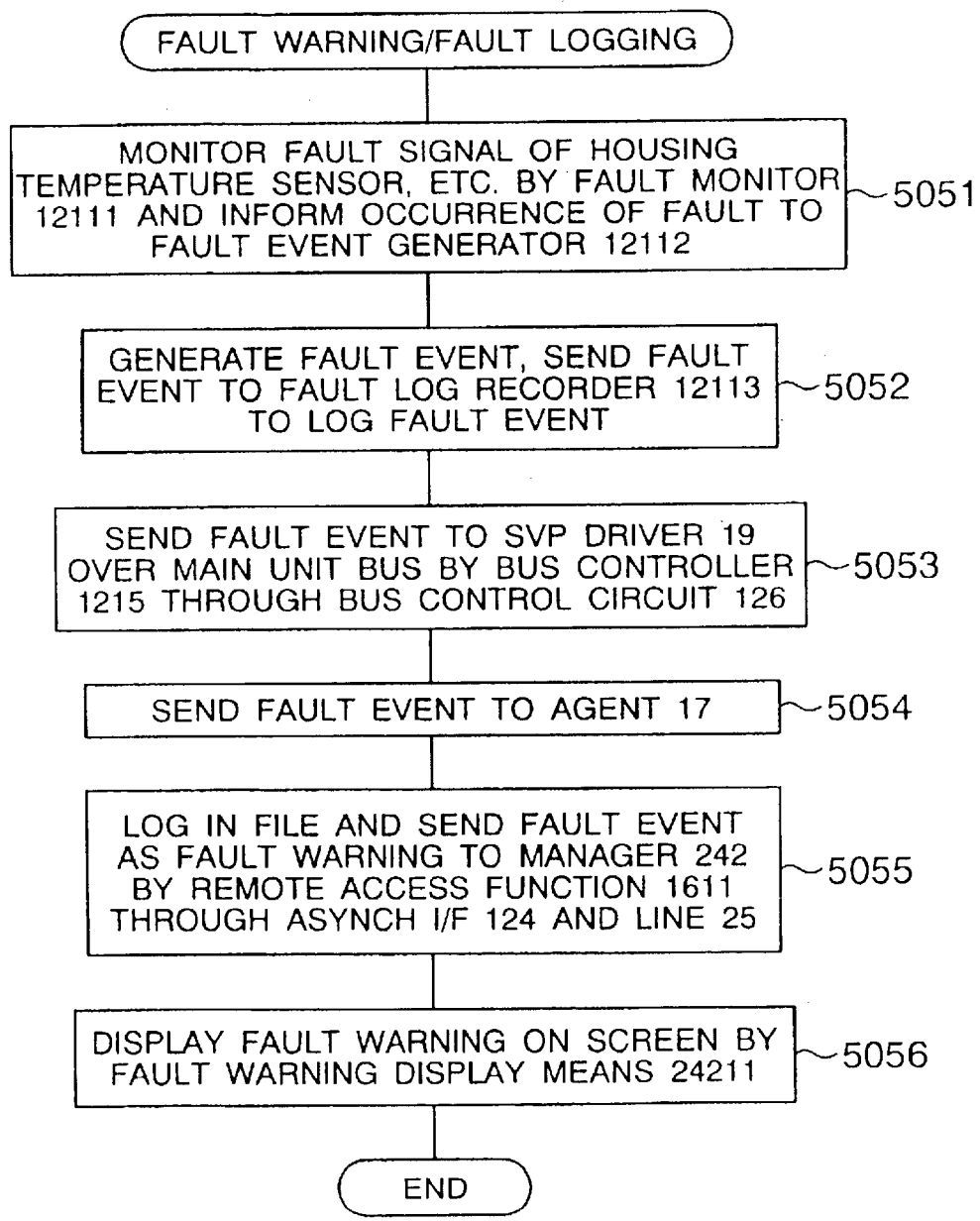
FIG. 11 shows a flow chart of a fault warning/fault logging procedure.

The fault warning and the fault logging in the agent 17 which are the fault monitor function in the steady sate in which the computer to be managed operates normally is now explained. An error signal such as an abnormal housing temperature, the stop of a cooling fan or a fault in the power supply unit is informed as a fault signal from the computer 10 to be managed to the SVP board through a cable. As shown in FIG. 11, the fault monitor 12111 continuously monitors the fault signal from the housing temperature sensor of the main unit to inform the occurrence of the fault to the fault event generator 12112 (step 5051). The fault event generated by the fault event generator 12112 is logged in the fault log recorder 12113 and also sent to the agent 17 through the bus of the main unit and the SVP driver 19 (steps 5092~5054). Since the capacity of the log area in the SVP is limited, after the agent 17 logs the fault event in the file, it sends it to the manager 242 as the fault warning when the remote access connection is established (step 5055). It may be considered that the fault log in the SVP is logged as a spare for the loss of the fault log saved in the file by a fault of the disk. While the description is addressed to the management in the remote management computer, the fault event is, of course, sent to the manager 241 connected by the LAN. When the fault warning is sent, the fault warning display means 24211 of the manager 242 displays it on a screen by a graphic user interface such as a fault warning window to immediately inform the occurrence of the fault to the user. In this manner, the prevention of the critical fault and the reduction of the time to countermeasure the fault are attained (step 5056).

Figure 12:
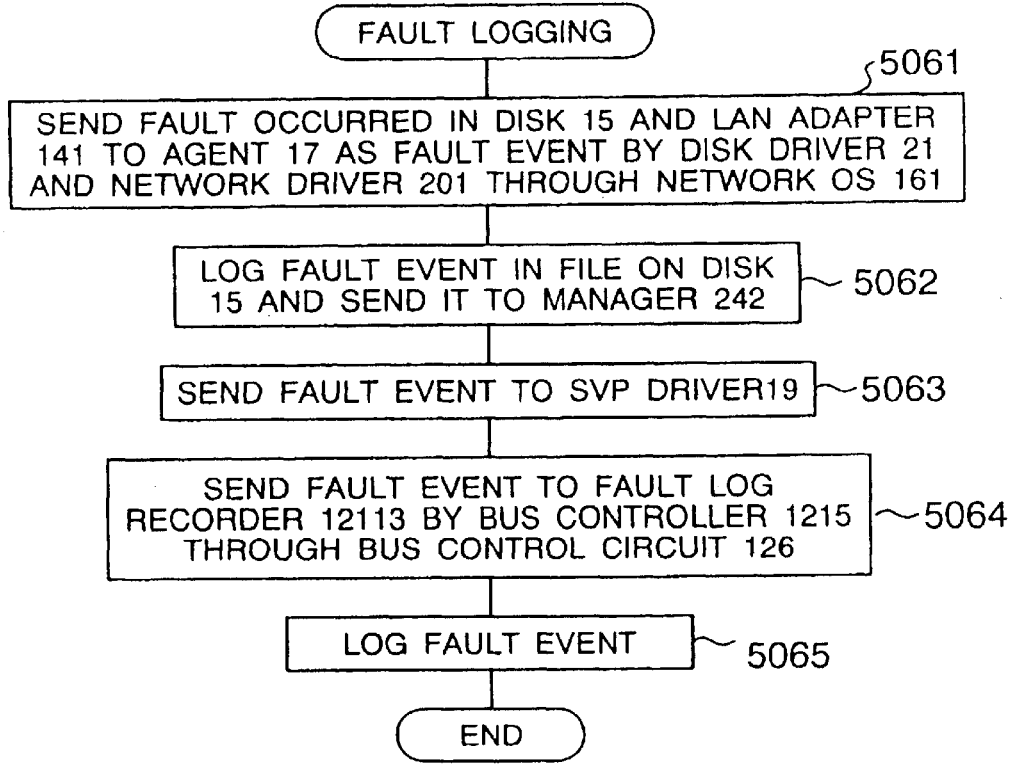
FIG. 12 shows a flow chart of a fault logging procedure.
Figure 13:
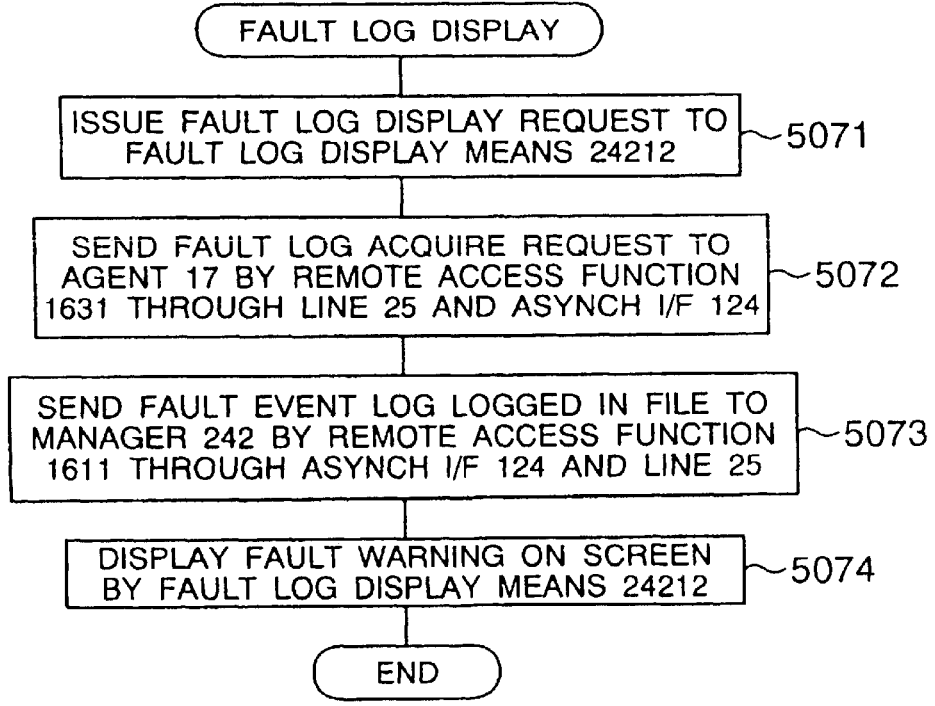
FIG. 13 shows a flow chart of a fault log display procedure.
Figure 14:
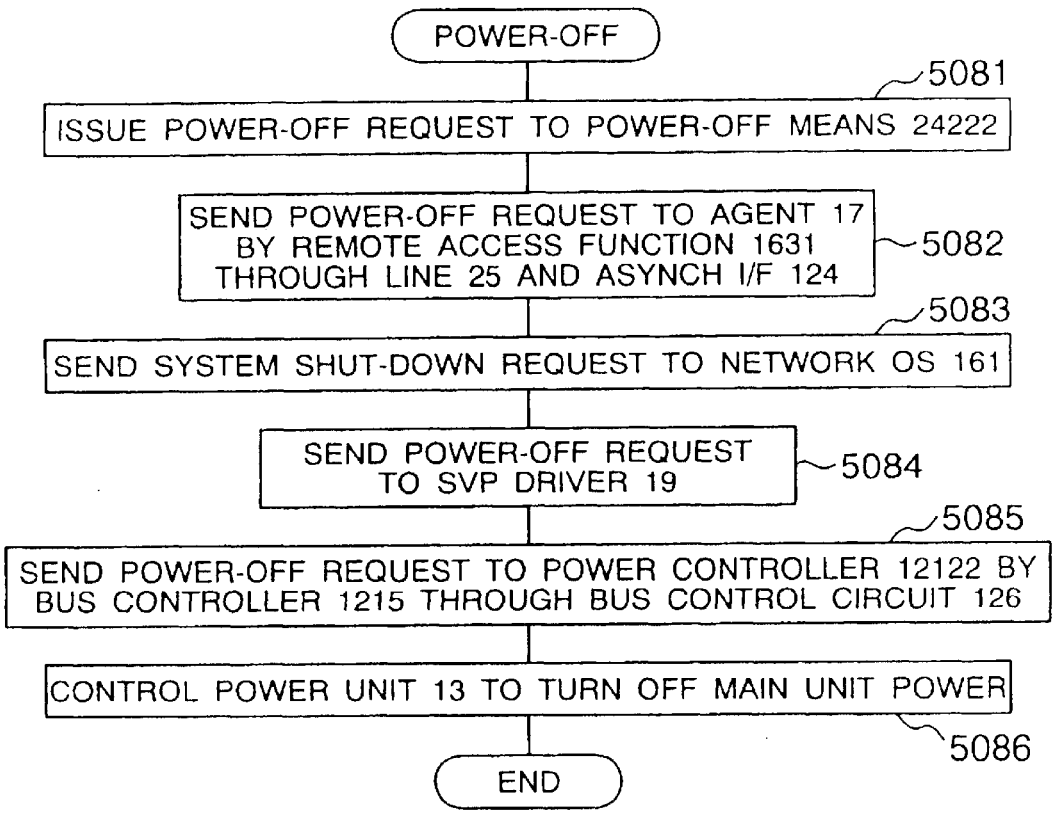
FIG. 14 shows a flow chart of a power-off procedure.

As shown in the flow chart of FIG. 12, the fault event is detected not only in the SVP board but the fault event generated in the disk 15 or the network adaptor 141 are similarly sent from the disk driver 21 or the network driver 201, respectively, as it is from the SVP driver 19 and the agent 17 logs it in the file and sends it to the manager 242 (steps 5061~5062). For the fault events occurred in other than the SVP board, the agent 17 sends the fault event to the fault log recorder 12113 of the SVP board 12 through the SVP diver 19 to save it as the log in the SVP (steps 5063~5065).

Those fault logs are not only sent to the manger as the warning but also all fault logs may be referred from the manages 241 and 242 as required. As shown in the flow chart of FIG. 13, the user sends a fault log request by the fault log display means 24212 of the manager 232 to the agent 17 through the remote access function 1631 while the remote access connection is established by the remote access function 1631 (steps 5071~5072). The agent 17 sends the fault log logged in the file back to the manager and displays it on the screen by the fault log display means 24212 (steps 5073~5074). In this manner, the user may analyze the status of the computer from the fault history to prevent the critical fault or derive the analysis data for the cause of fault.

The power control of the computer 10 by the manager 242 is now explained. The power manager 2422 of the manager 242 comprises power-off means 24222 and a preset time power-on/off means 24211. For the power-off means 24222, as shown in the flow chart of FIG. 14, the user sends a power-off request by the power-off means 24222 to the agent 17 by the remote access function 1631 (steps 5081~5082). The agent 17 issues a system shut-down request to the network OS 161, and after the system has been shut down, it sends the power-off request to the power controller 12122 of the SVP board 12 through the SVP driver 19. The power controller 12122 receives the power-off request and controls the power unit 13 to immediately turn off the power (steps 5083~5086).

Figure 15:
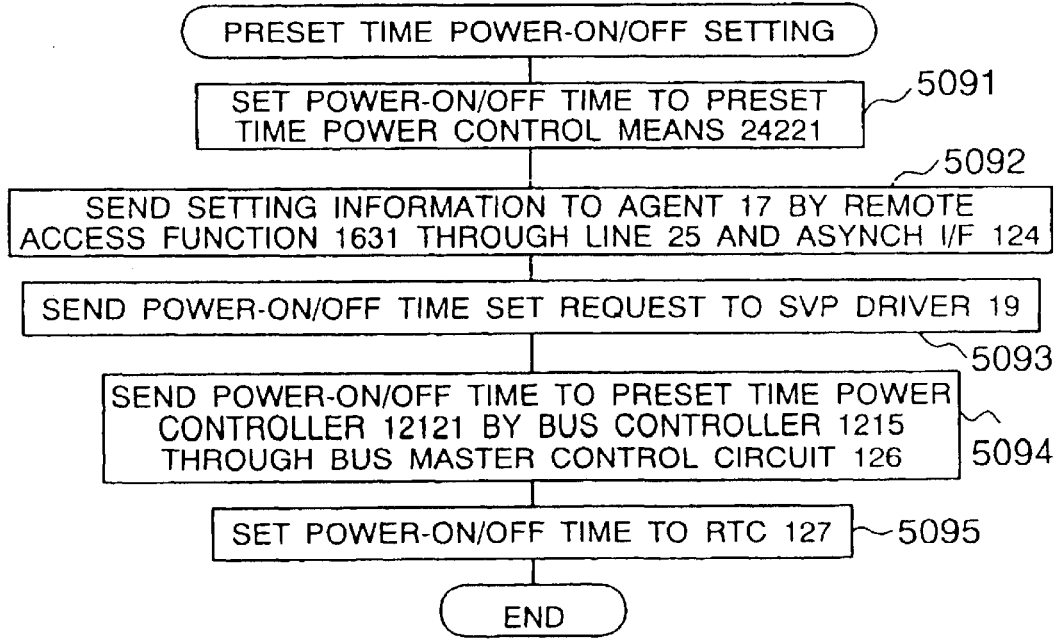
FIG. 15 shows a flow chart of a preset time power-on/off time setting procedure.

For the preset time power-on/off setting, as shown in the flow chart of FIG. 15, the power-on/off request time which is set by the user by the preset time power control means 24221 is sent to the agent 17 by the remote access function 1631 (steps 5091~5092). The agent 17 sends the power-on/off request time to the preset time power controller 12121 of the SVP board 12. The preset time power controller 12121 sets the power-on/off request time to the RTC (real time clock) (steps 5093~5095).

Figure 16:
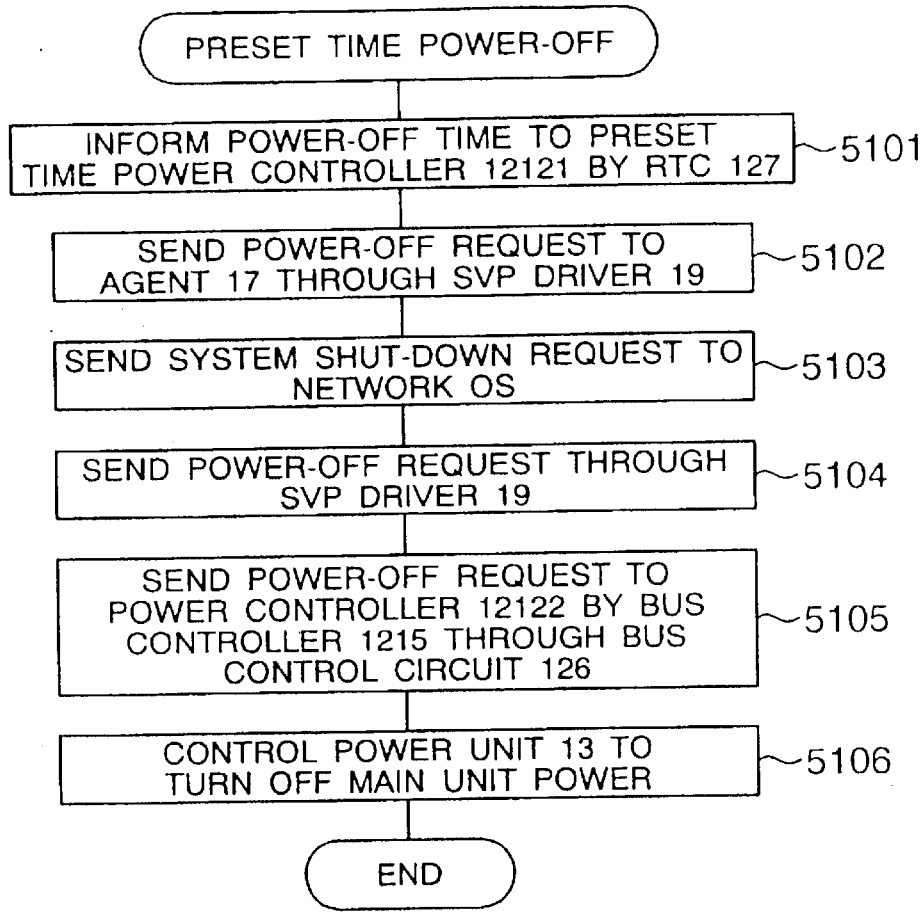
FIG. 16 shows a flow chart of a preset time power-off procedure.

For the preset time power-off, as shown in the flow chart of FIG. 16, when the preset power-off request time is reached, the RTC 127 informs the arrival of the power-off request time to the preset time power controller 12121 (step 5101). The preset time power controller 12121 sends the power-off request to the agent through the SVP driver (step 5102). The agent 17 issues the system shut-down request to the network OS 161, and after the system has been shut down, it sends the power-off request to the power controller 12122 of the SVP board 12 through the SVP driver 19. The power controller 12122 receives the power-off request and immediately controls the power unit 13 to turn off the power (steps 5103~5106).

Figure 17:
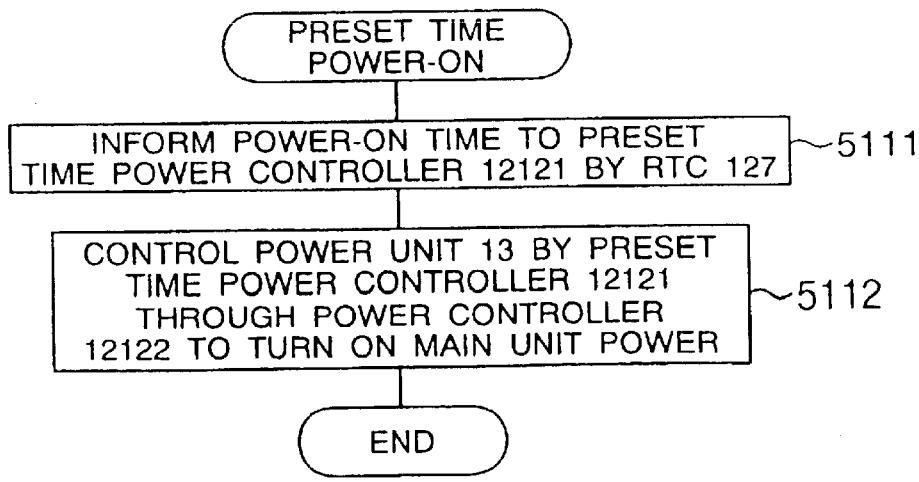
FIG. 17 shows a flow chart of a preset time power-on procedure.

For the preset time power-on, as shown in the flow chart of FIG. 17, when the preset power-on request time is reached, the RTC 127 informs the arrival of the power-on request time to the preset time power controller 12121 (step 5111). The preset time power controller 12121 controls the power unit 13 through the power controller 12122 to turn on the power (step 5112).

The critical fault manager 293 of the SVP manager 29 is now explained. The critical fault manager 293 comprises automatic fault information reception means 2931, fault diagnosing means 2932, remote reset means 2933 and system operation check means 2944 for providing diagnosis based on the information, the resetting and the initial countermeasures from the remote management computer 27 when the critical fault occurs in the computer 10 to be managed.

Figure 18:
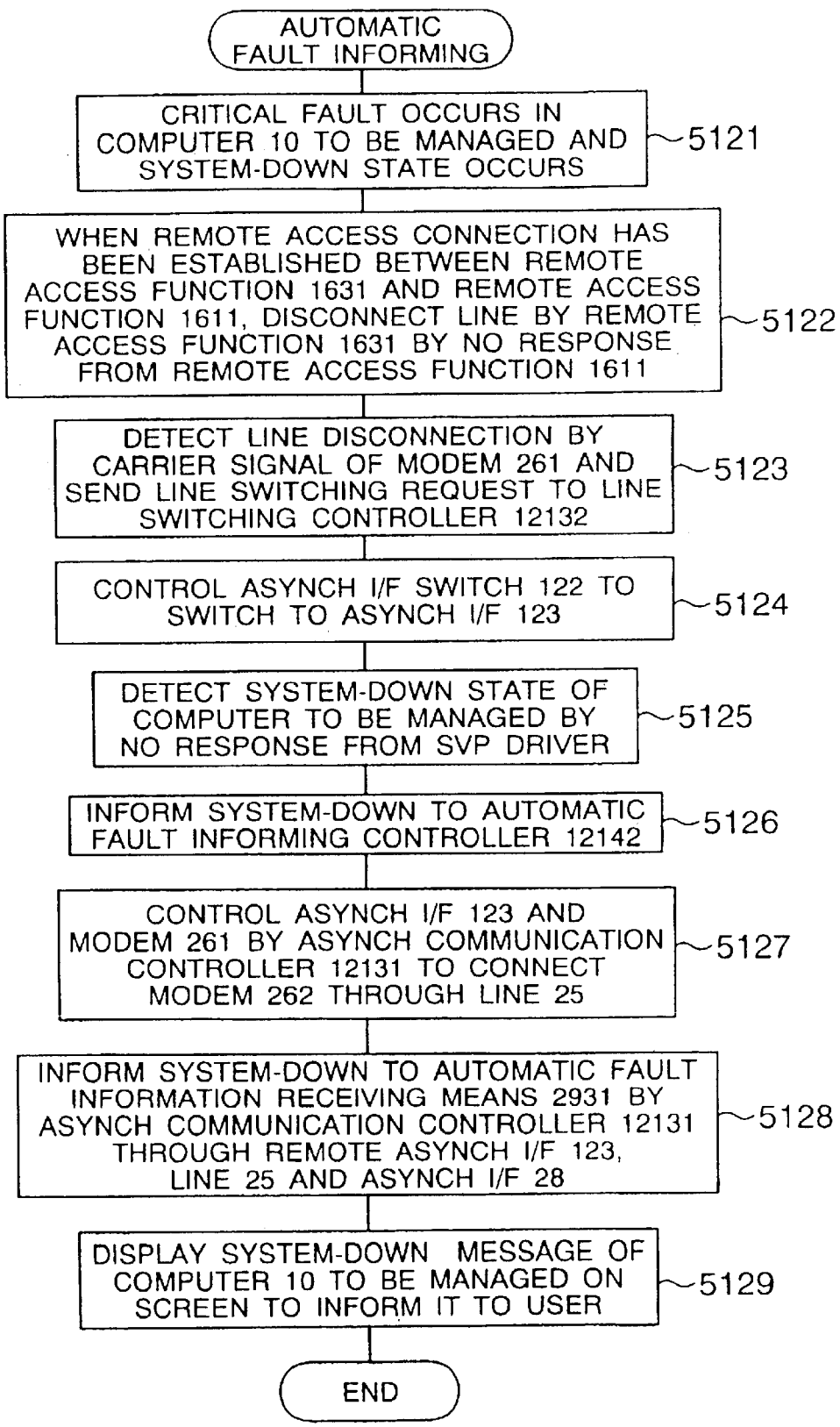
FIG. 18 shows a flow chart of an automatic fault informing procedure.

As shown in the flow chart of FIG. 18, when the critical fault occurs in the computer 10 to be managed and the remote access connection is made between the remote access function 1631 and the remote access function 1611, the line is disconnected by the remote access function 1631 because of the absence of the response by the remote access function 1611 (steps 5121~5122). During the remote access connection, the line connection monitor 12133 monitors the disconnection of the line by the carrier signal of the modem 261 of the asynchronous I/F driver 125. When it detects the disconnection of the line, it sends the line switching request to the line switching controller 12132 to switch the asynchronous I/F switch 122 to the asynchronous I/F 123 (steps 5123~5124). When the remote access connection is not established, the steps 5122~5124 are skipped. The OS status monitor 12141 of the main unit periodically communicates with the SVP driver 19 to check, from time to time, the normal operation of the computer 10 to be managed. For the critical fault, because of the absence of the response from the SVP driver 19, the system-down of the computer 10 to be managed is detected and it is informed to the automatic fault informing controller 12142 (steps 5125~5126). The automatic fault informing controller 12142 connects the line with the remote management computer 27 by the asynchronous communication controller 12131 by the previously registered telephone number to inform the system-down to the automatic fault information reception means 2931 of the SVP manager 29 (steps 5127~5128). The automatic fault information reception means 2931 displays the system-down message of the computer 10 to be managed to inform it to the user (step 5129).

Figure 19:
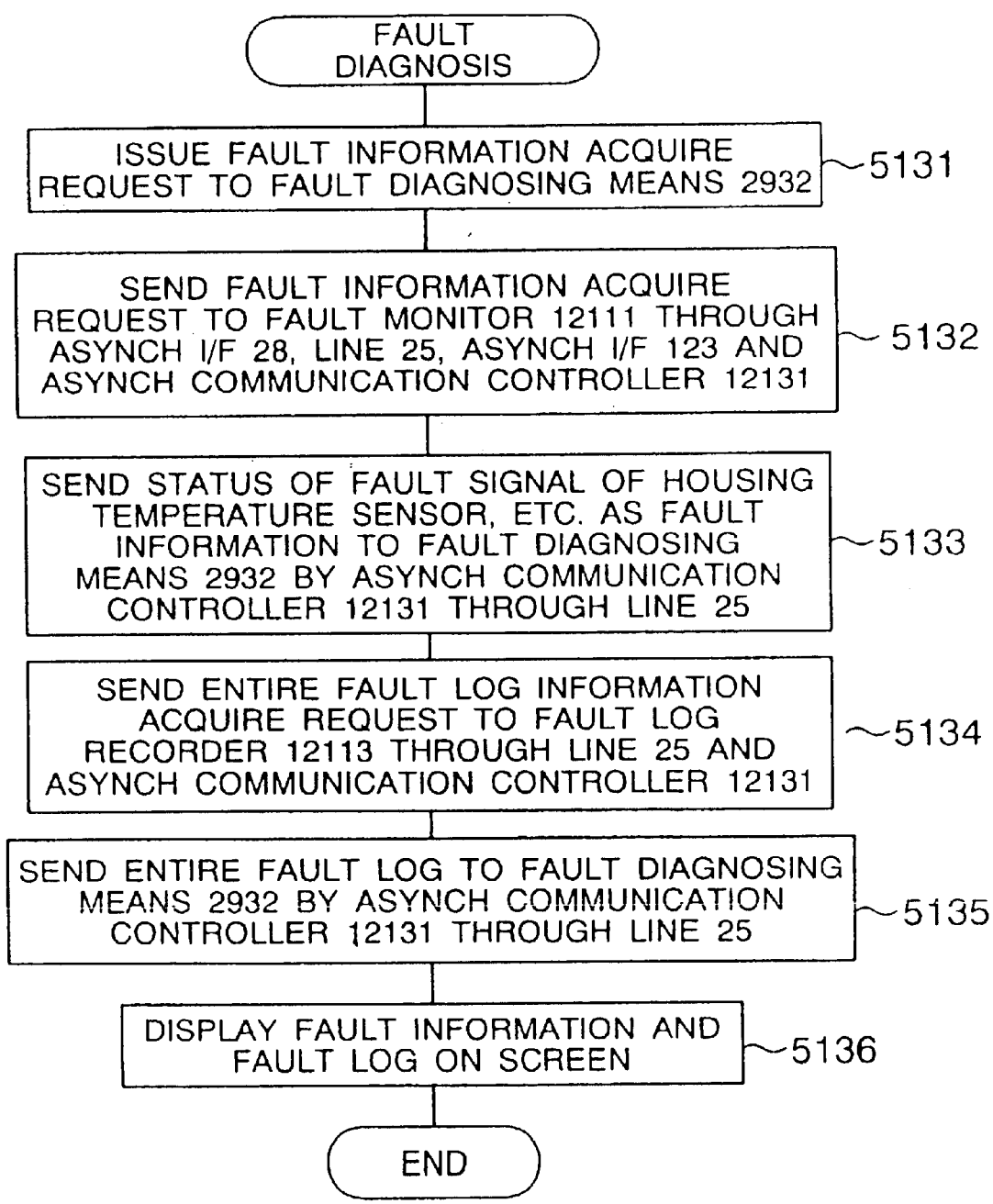
FIG. 19 shows a flow chart of a fault diagnose procedure.

As shown in the flow chart of FIG. 19, in the fault diagnosis, the user who received the information of the critical fault issues the fault information acquire request to the fault diagnosing means 2932 (step 5131). The fault diagnosing means 2932 requests the fault signal information to the fault monitor 12111 of the SVP 12 through the line 25 and the entire log information to the fault log recorder 12113, acquires them through the line 25 and displays them on the screen (steps 5132~5136). The user may watch them to confirm the current status of the commuter 10 to be monitored and also confirm the history to the critical fault from the history of the fault log.

Figure 20:
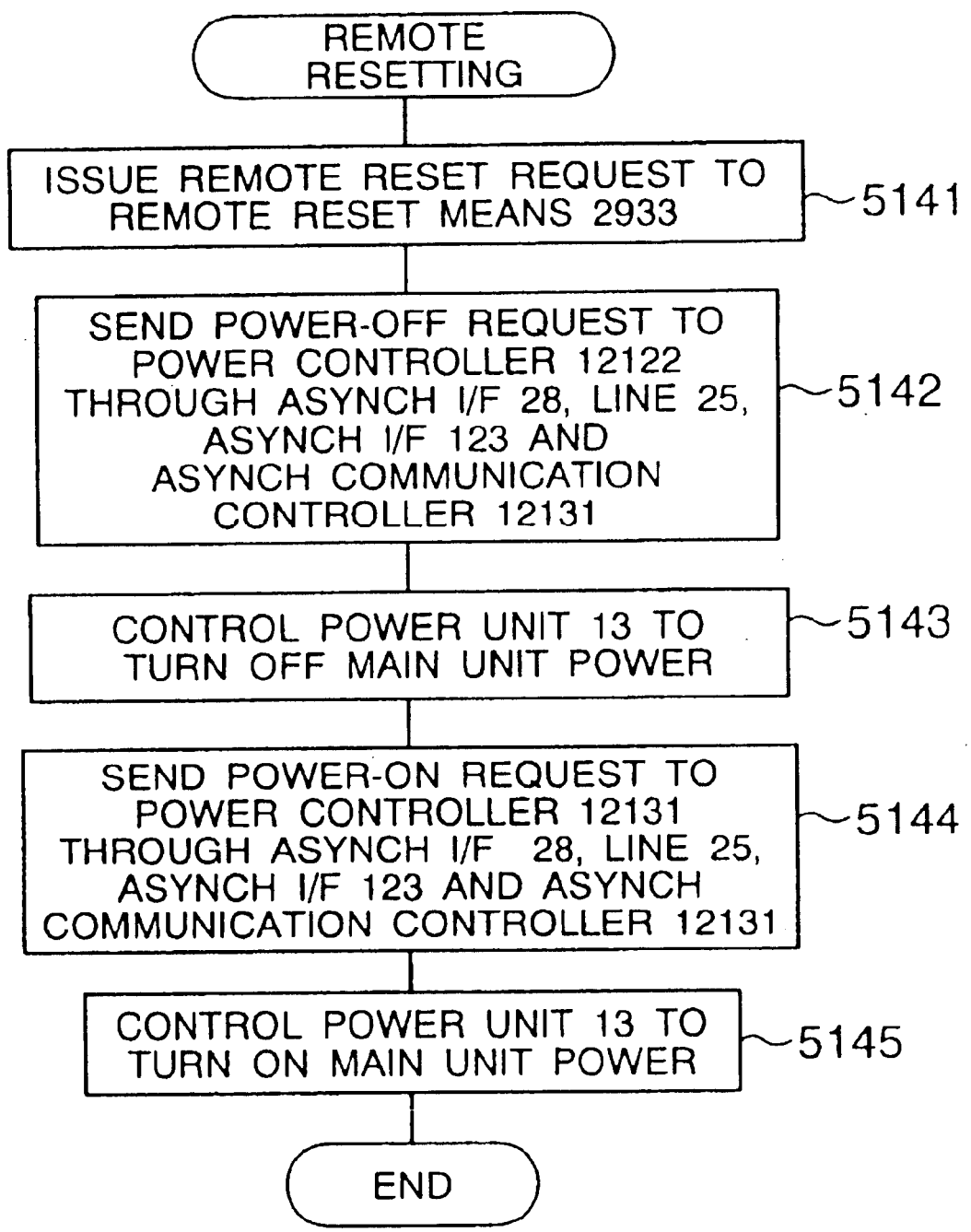
FIG. 20 shows a flow chart of a remote reset procedure.

For the remote reset, as shown in the flow chart of FIG. 20, the remote reset means 2933 sends the power-off request and the power-on request sequentially to the power controller 12122 through the line 25 to turn on the power immediately after the power-off to reset the computer 10 to be managed (steps 5141~5145). When no significant problem is detected by the diagnosing means 2932, the computer 10 to be managed is restarted by the reset. Most causes of the system-down are troubles in the network OS or the fault occurred by chance and the normal operation may be recovered in many cases by the restarting. The restarting by the user's decision is effective means as the initial measures.

Figure 21:
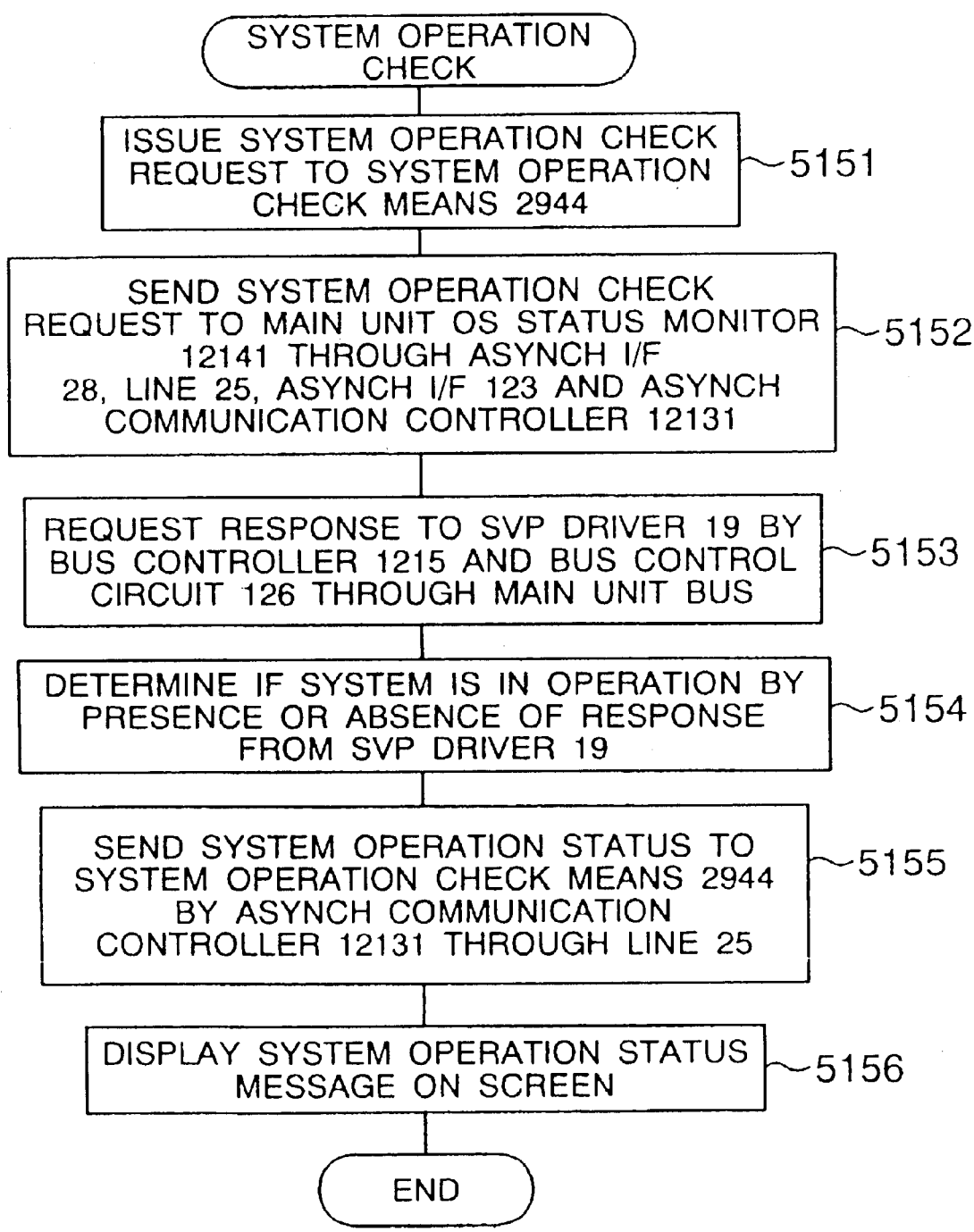
FIG. 21 shows a flow chart of a system operation confirmation procedure, FIG. 22 show a block diagram of an embodiment of hardware of the SVP board.

As shown in the flow chart of FIG. 21, to check the system operation after the remote reset, the system operation check means 2944 sends the system operation check request to the OS status monitor 12141 of the main unit through the line 25 (steps 5151~5152). The OS status monitor 12141 of the main unit requests the response to the SVP driver 19, determines whether the system is in operation or not by the presence or absence of the response, and returns the result to the system operation check means 2944 through the line 25 (steps 5153~5135). The system operation check means 2944 displays the message of the system operation status on the screen to inform it to the user (step 5156).

Figure 22:
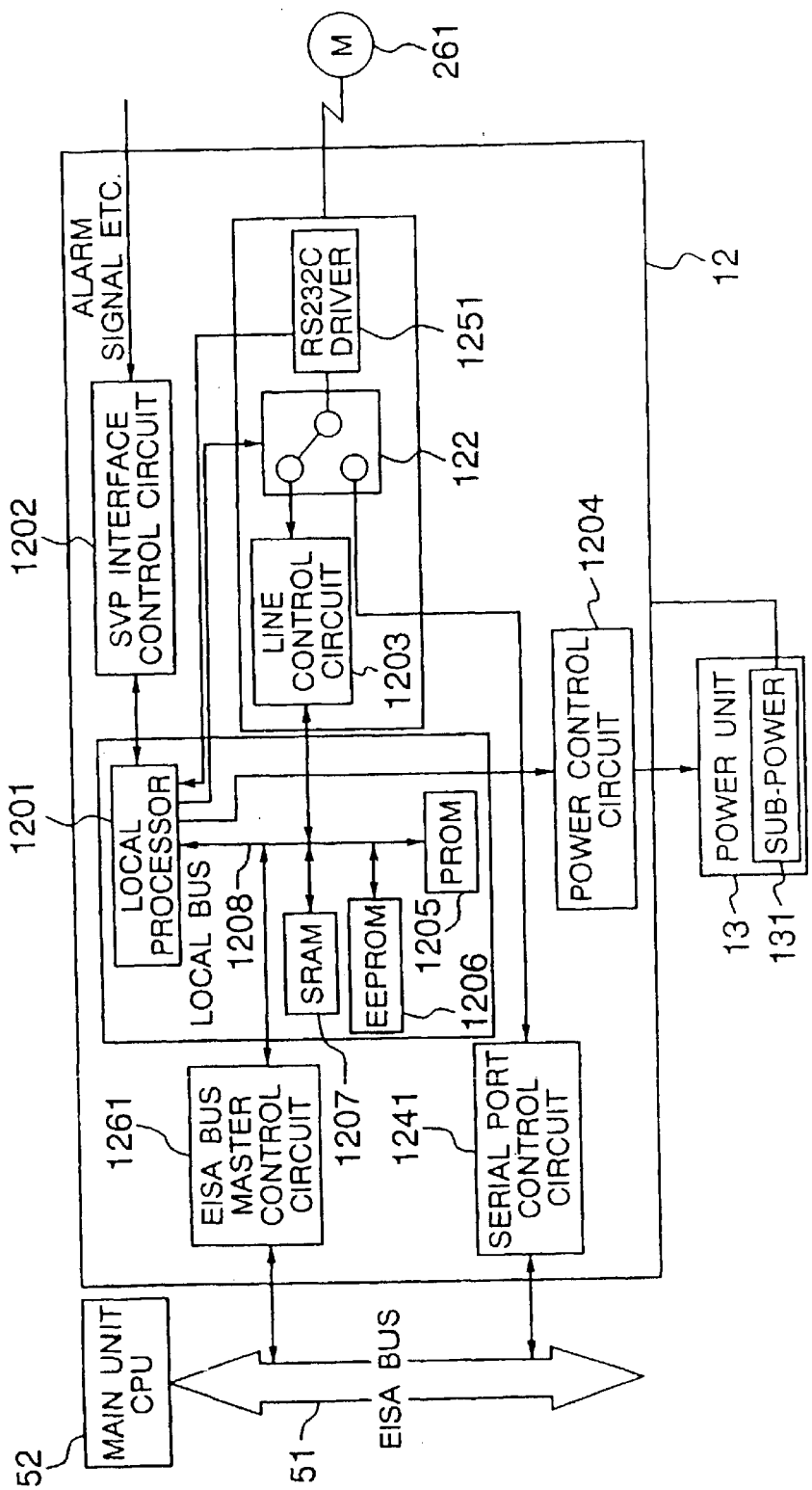

Referring to a block diagram of FIG. 22, an embodiment of hardware of the SVP board 12 is explained.

Numeral 1201 denotes a local processor of the SVP board 12 which is independent from the CPU 52 of the computer 10 to be managed. Numeral 1202 denotes an SVP interface control circuit by which the local processor 1201 inputs a status of the signal from the signals sent as the information on the fault from the sensors for monitoring the fault of the computer 10 to be monitored. The sensor may be a sensor for monitoring the abnormal temperature of the housing, a sensor for monitoring the stop of a fan, a sensor for monitoring an error in the power unit, a sensor for monitoring the fault of a peripheral device board connected to the bus and a sensor for monitoring a disk drive, particularly hard disk drives of a disk array.

Numeral 1203 denotes a line control circuit for controlling the modem 261 connected to the line 25 to conduct the communication. Numeral 1204 denotes a power control circuit for controlling the power unit 13 to control the power-on/off of the computer 10 to be managed. The SVP board 12 is continuously supplied from the sub-power supply 131. Numeral 1205 denotes a PROM for storing a start program of the SVP board and numeral 1206 denotes a rewritable EEPROM for storing a program of the SVP controller 121 and the fault log information. Numeral 1207 denotes an SRAM which is used as a work area to execute the control program of the SVP program. The SVP controller 121 controls the by the local processor 1201 as the control program on the EEPROM 1206 and the SRAM 1207. Numeral 1208 denotes a local bus for connecting the memory and the peripheral circuit to the local processor 1201. Numeral 52 denotes a CPU of the computer 10 to be managed and numeral 51 denotes an EISA bus of the main unit for connecting the SVP board 12 and the main unit. Numeral 1241 denotes a serial port controller accessible from the main unit CPU 52 and operates as an asynchronous I/F by which the main unit CPU 52 is connected to the modem 261 through the EISA bus 51. Numeral 1251 denotes an RS232C driver circuit for connecting the modem 261 and the SVP board. The local processor 1201 monitors the carrier signal of the modem 261 from the RS232C driver circuit 1251 to monitor the connection status of the line. Numeral 1261 denotes an EISA bus master control circuit by which the local processor 1201 accesses the I/O of the computer 10 to be monitored and the memory through the EISA bus 51.

A relation between the embodiment of FIG. 5 and the block diagram of FIG. 22 is now explained. The bus controller 1215 controls the EISA bus master control circuit 1261 corresponding to the bus control circuit 126 and exchanges data such as the fault event data with the SVP driver 19 and the agent 17. The fault monitor 12111 receives the alarm signal such as the abnormal temperature of the housing, the error in the power unit or the stop of the fan through the SVP interface control circuit 1202 and informs the occurrence of the fault to the fault event generator 12112. The line connection monitor 12133 monitors the carrier signal of the modem 261 from the RS232C driver circuit 1251 to monitor the connection status of the line. The line switching controller 12132 controls the asynchronous I/F switching circuit 122 by the switching request from the line switching means 2911 of the SVP manager 29 and the switching request from the line connection monitor 12133 to select the line control circuit 1203 or the serial port control circuit 1241. When the line control circuit 1203 is selected, the asynchronous communication controller 12131 controls the line control circuit 1203 to exchange data with the SVP manager 29 through the line 25. On the other hand, when the serial port control circuit 1241 is selected, the line driver 181 of the management computer 10 controls the serial port control circuit 1241 to connect the remote access function portions 1611 and 1631 through the line 25. The power controller 12122 controls the power control circuit 1204 by the agent 17, the preset time power controller 12121 and the power-on/off request of the remote power-on/off means to control the on/off of the power unit 13.

The flow charts of FIGS. 6~20 should be interpreted to correspond to portions of media such as ROMs and floppy disks which store processor-readable programs to implement the corresponding functions shown in the flow charts.

Figure 23A:
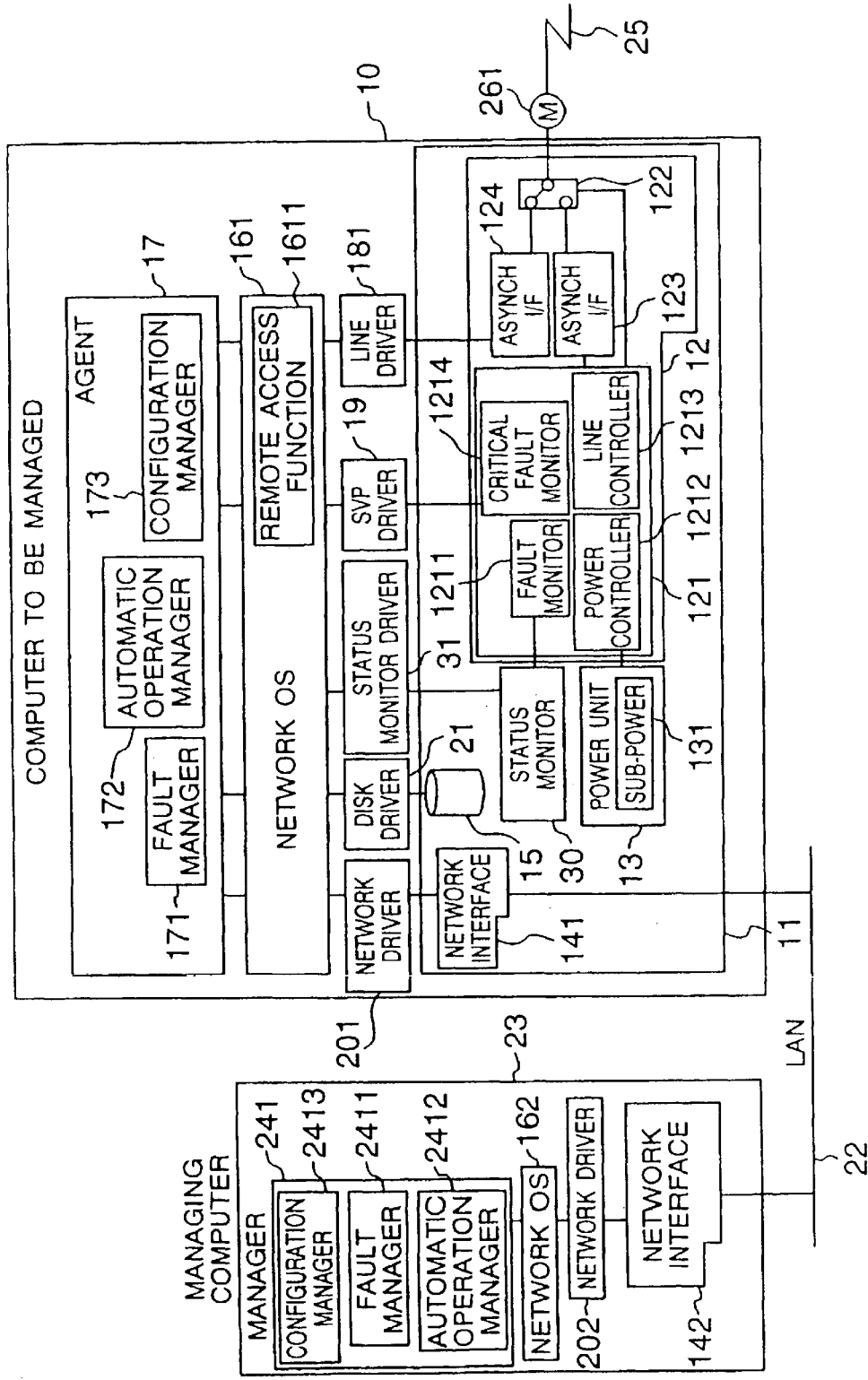
FIGS. 23A, 23B and 24 show block diagrams of other embodiment which is a modification of the embodiment of FIG. 1 and detail of the modification.
Figure 23B:
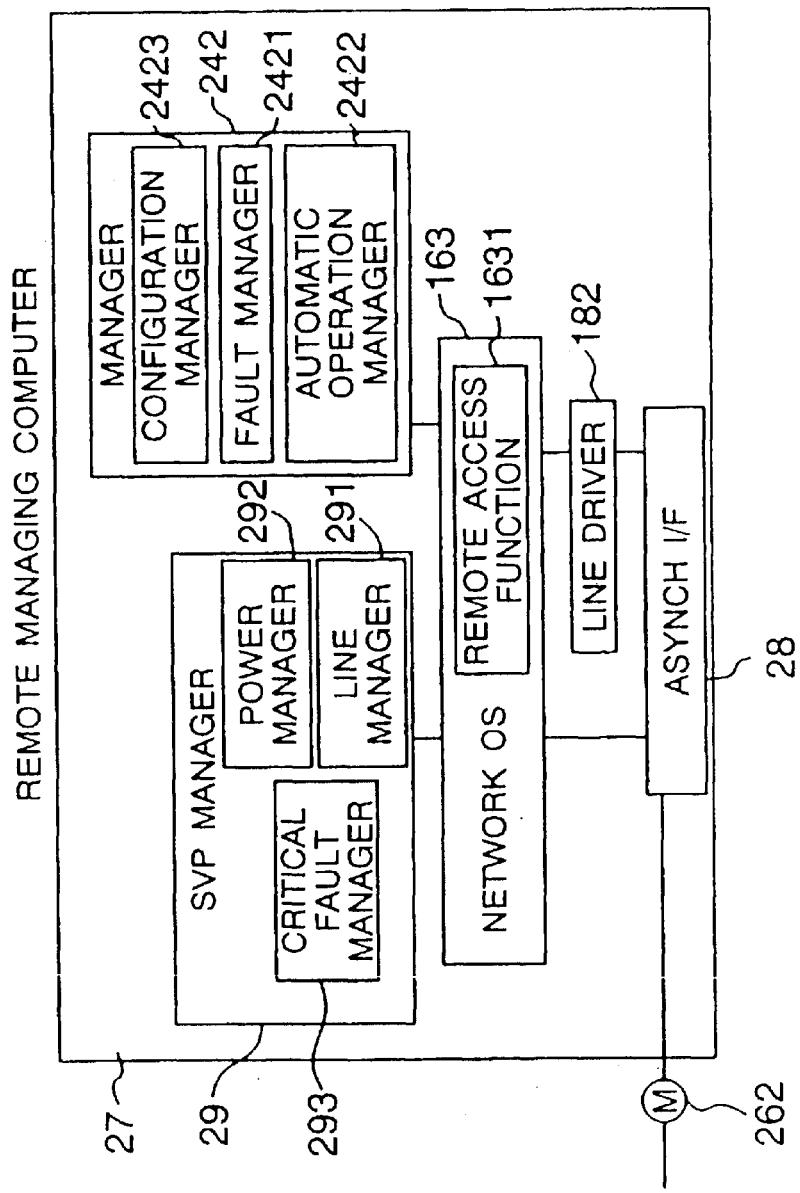
Figure 24:
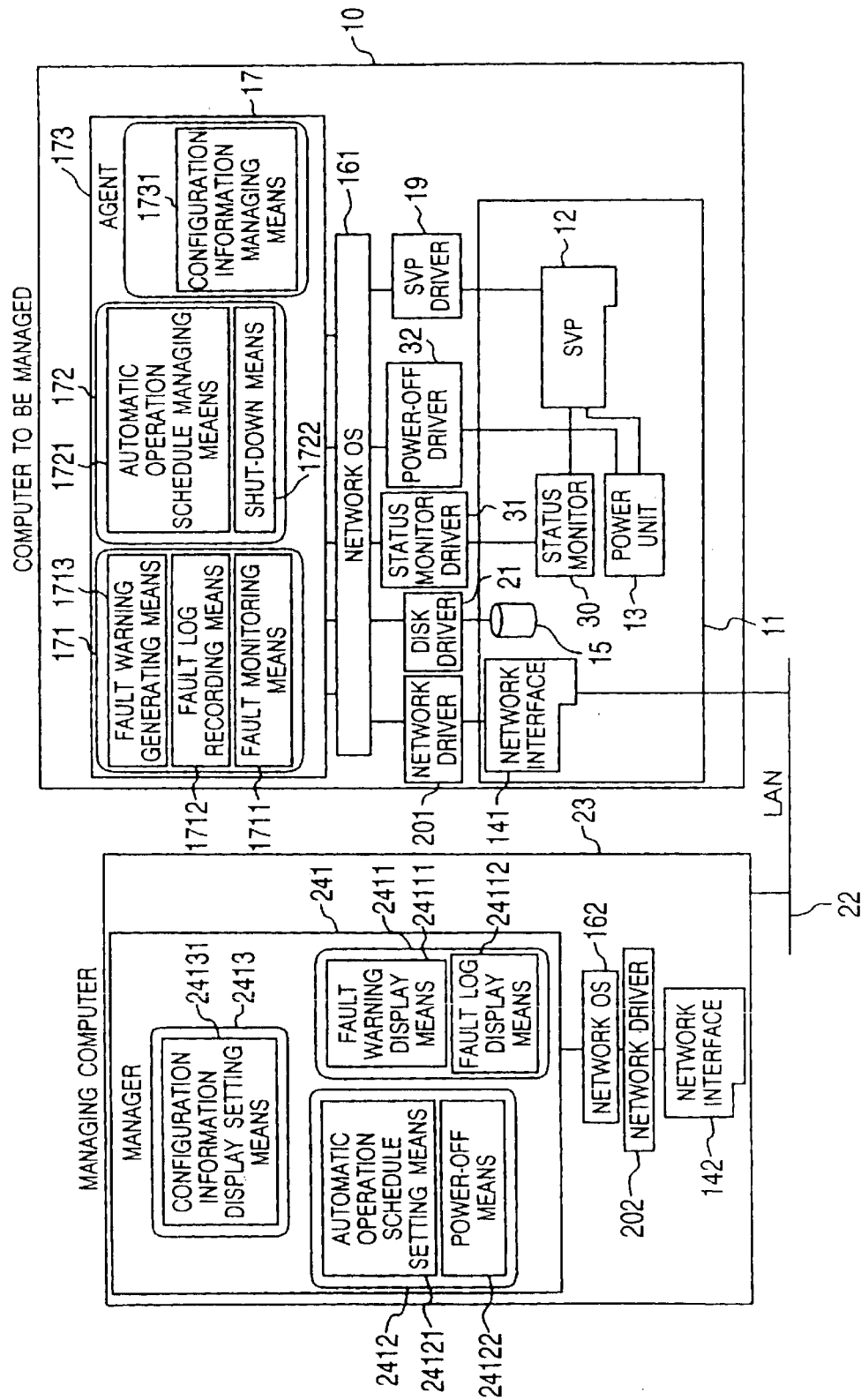

FIGS. 23A, 23B and 24 show a modification of the embodiment of FIG. 1.

The modified embodiment of FIGS. 23A and 23B, as compared with FIG. 1 includes in the agent 17 of the computer 10 to be managed, a fault manager 171, an automatic operation manager 172 and a configuration manager 173, details of which are shown in FIG. 24. Further, a status monitor circuit 30 and a status monitor driver 31 are provided. A manager of the management computer 23 and a manager 242 of the remote management computer 27 include configuration managers 2413 and 2423 and automatic operation managers 2412 and 2422, respectively.

Referring to FIGS. 23A, 23B and 24, an embodiment of the fault management, the automatic operation management and the configuration management focused at the agent 17 is explained.

In FIG. 23, a numeral 30 denotes a status monitor circuit for monitoring the status and error of the devices of the computer 10 to be managed such as the temperature of the housing, the operation status of the fan and the operating status of the power unit, numeral 31 denotes a status monitor driver for accessing the status monitor circuit 30 to acquire the information in the status of the devices and numeral 32 denotes a power-off driver for controlling the power unit 13 to turn off the power of the computer 10 to be managed. Numeral 171 denotes a fault manager for managing the fault of the devices of the computer 10 to be managed in the agent 17, numeral 1711 denotes fault monitor means for accessing the status monitor driver 31, the network driver 201 and the disk driver 21 to monitor the status of the devices and determine the abnormal state to generate the fault event, numeral 1712 denotes fault log record means for recording the fault log of the fault event in the disk and numeral 1713 denotes a fault warning generation means for sending the fault event to the manager 241 as the fault warning. Numeral 172 denotes an automatic operation manager for managing the automatic operation of the computer 10 to be managed in the agent 17, numeral 1721 denotes automatic operation schedule management means for storing schedule information for one year, for example, for the automatic operation in the disk and controlling the automatic operation of the computer 10 to be managed in accordance with the schedule and numeral 1722 denotes shut-down means for issuing a shut-down request to the network OS 161 in response to the power-off request. Numeral 173 denotes a configuration information manager for acquiring and setting the configuration and the status of the devices and the network OS 161 from the fault monitor driver 31 and the SVP driver 19. Numeral 2411 denotes a fault manager of the manager for providing the fault management user interface, numeral 24111 denotes fault warning display means for displaying the fault warning from the fault warning generation means 1713 on the screen of the management computer, numeral 24112 denotes a fault log display means for displaying the fault log recorded in the fault log record means 1712 on the screen, numeral 2412 denotes a manager operation manager for providing a user interface of the automatic operation, numeral 24121 denotes automatic operation schedule setting means for setting the schedule in the automatic schedule management means 1721, numeral 24122 denotes power-off means for turning off the power of the computer 10 to be managed by the means 1722, numeral 2413 denotes a manager configuration information manager for providing a user interface of the configuration information management, and numeral 24131 denotes configuration information display setting means for displaying and setting the configuration information on the screen through the configuration information management means 1731. Other configuration is same as that of the embodiment of FIG. 1.

In the present embodiment, the agent 17 directly accesses the status monitor circuit 30 without routing the SVP 12 to monitor the status of the hardware to determine the hardware fault such as the abnormal temperature of the housing, the stop of the fan and the error in the power unit. The fault monitor means 1711 of the agent 17 accesses the status detection circuit 30 through the status monitor driver 31 to monitor the hardware status of the computer 10 to be monitored such as the housing temperature, the operating status of the fan and the operating status of the power unit to determine the abnormal status of the hardware and generate the fault event. Information such as an event name, date of occurrence of fault and source of fault are set in the fault event. The fault monitor means 1711 monitors the status of the devices through the network driver 201, the disk driver 21 and the SVP driver 19 to determine the abnormal status of the devices and generate the fault event. After the generation of the fault event, the fault monitor means 1711 sends the generated fault event to the fault log record means 1712 and the fault warning generation means 1713. The fault log record means 1712 records the fault event and the fault log on the disk. The recorded fault log may be referred to by the user through the fault log display means 24112 of the manager 241. On the other hand, the fault warning means 1713 adds the name of the computer 10 to be managed in which the fault has occurred to the fault event to generate the fault warning and sends it immediately to the fault warning display means 24111 of the manager 241 to display the fault warning message to inform the occurrence of the fault to the user.

The power-off of the computer 10 to be managed is now explained. By the power-off operation by the user, the power-off means 24122 of the manager 241 sends the power-off request to the shut-down means 1722 of the agent 17 through the LAN 22. Then, the shut-down means 1722 issues the shut-down request to the network OS 161. After the shut-down process, when the shut-down completion notice is received by the power-off driver 33 from the network OS 161, the power-off driver 33 sets the power-off to the power unit 13 to power off the computer 10 to be managed.

The automatic operation management is now explained. The automatic operation schedule setting means 24121 of the manager causes the user to set the automatic operation schedule of the computer 10 to be managed through the graphic user interface such as a calendar and sends the automatic operation schedule information to the schedule management means 1721 of the agent 17. When the automatic schedule management means 1721 receives the schedule information, it stores it in the disk and automatically operates the computer 10 to be managed in accordance with the schedule information. In order to attain the power-off at the preset time of the schedule information, the automatic operation schedule management means 1721 searches the nearest future power-off time from the schedule information stored in the disk when the computer 10 to be managed is powered on and the agent 17 is executed, and sends it as the preset time power-off request to the SVP board 12 through the SVP driver 19. When the preset power-off request time is reached during the operation of the computer 10 to be managed, the SVP board 12 sends the power-off request to the shut-down process 1722 of the agent 17 through the SVP driver 19. The shut-down process 1722 shuts down the network OS 161 and then powers off the computer 10 to be managed in the same manner as the power-off of the manager 241. On the other hand, in order to attain the preset time power-on of the schedule information, the automatic operation schedule management means 1721 searches the nearest future power-on time from the schedule information stored in the disk during the shut-down process and sends it as the preset time power-on request to the SVP board 12 through the SVP driver 19. When the power-on request time is reached during the power-off of the computer 10 to be managed, the SVP board 12 controls the power unit 13 to immediately turn on the power.

The configuration information management is now explained. The configuration information management manages the information on the configuration and the status of the devices of the computer 10 to be managed and the network OS to provide the reference/setting function to the user. By the reference/setting request from the user, the configuration information display means 24131 of the manager 241 sends the acquire/setting request of the configuration information to the configuration information management means 1731 of the agent 17 through the LAN 22. When the configuration information managing means 1731 receives the acquire request, it collects the information on the configuration and the status of the network OS and the devices such as the number of CPUs and the capacity of the memory and the disk from the network OS 161, the network driver 201, the disk driver 21, the fault monitor driver 31 and the SVP driver 19, and sends it back to the configuration information display setting means 24131. The configuration information display setting means 24131 displays the sent-back information on the screen. On the other hand, when the configuration information management means 1731 receives the setting request, it sends the setting request to the network OS 161 and the drivers to change the setting.

In accordance with the present invention, the fault monitoring and the power control of the computers connected by the LAN as well as the public line may be centrally and uniformly conducted through the agent by the remote access function of the network OS in the same manner as that through the LAN, and the burden of the computer management by the system operator on the wide network is significantly reduced. The fault which may lead to the critical fault such as the abnormal temperature of the housing, the error in the power unit, the stop of the fan and the error in the disk may be systematically monitored in an early stage as the fault warning and the system fault may be prevented by the pre-countermeasures. Further, once the critical fault occurs and the computer is system-downed, the system operator may immediately receive the information through the public line or the network and the information on the fault may be acquired, and the remote power-off, the remote resetting and the confirmation of the system operation after the remote power-off can be attained so that the initial countermeasures to the critical fault may be immediately taken. In this manner, the system-down time may be reduced and the damage by the fault may be minimized. Further, the automatic preset time power-on/off and the remote power-on/off control may be attained through the LAN and the public network and the central operation management of the computers connected to the network is attained, the burden of the system operator is reduced and the remote operation maintenance is supported.

What is claimed is:

1. A device comprising:
    a power unit which supplies power to said device;
    first means for accepting an instruction for controlling said power unit from a managing computer via a network, said instruction includes information indicating whether to turn on or off power supplied by said power unit to said device;
    second means for converting said instruction into a power unit control signal,
    wherein said second means controls said power unit based on said power unit control signal,
    wherein said power unit continuously supplies power to said second means,
    wherein said power unit comprises:
        a first power supply unit which supplies power to said device, and
        a second power supply unit which supplies power to said second means for controlling said device, and
        wherein said second means, upon converting said instruction into said power unit control signal, transmits said power unit control signal to said first power supply unit to perform on and off control of said device.

2. A device according to claim 1, wherein said device includes at least a server to be managed.

3. A device according to claim 1, wherein said second means further comprises:
    hardware of a computer to be managed.

4. A device according to claim 3, further comprising:
    at least a server to be managed.

5. A device according to claim 3, wherein said second means further comprises:
    a processor independent from a central processing unit of said device.

6. A device according to claim 3, wherein said second means further comprises:
    a power control circuit for turning the power unit ON and OFF.

7. A device according to claim 1, wherein said device further comprises:
    a central processing unit,
    wherein said second means comprises:
        a processor,
        wherein said power unit supplies said central processing unit and said processor of said second means with power, and
        wherein said second means controls the supply of power to the central processing unit by said power unit.

8. A device according to claim 7, wherein said power unit always supplies power to said processor of said second means.

9. A device according to claim 7, wherein said second means comprises:
    shut-down means for shutting down a program executed by said central processing unit.

10. A device according to claim 9, wherein said shut-down means shuts down a program executed by said central processing unit before said second means stops said power unit from supplying power to said central processing unit.

11. A device according to claim 1, wherein when said instruction is a power-off instruction of said device said second means sends said power-off instruction to means which controls an operating system of said device.

12. A device comprising:

a power unit which supplies power to said device;

first means for accepting an instruction for controlling said power unit from a managing computer via a network, said instruction includes information indicating whether to turn on or off power supplied by said power unit to said device;

second means for converting said instruction into a power unit control signal and performing control of said power unit based on said power unit control signal, wherein said second means comprises:

means for detecting a result and state of control of said power unit for said device, and means for transmitting said detected result and state from said detecting means to said managing computer via said network, wherein said power unit continuously supplies power to said second means, wherein said power unit comprises:

a first power supply unit which supplies power to said device, and a second power supply unit which supplies power to said second means for controlling said device, and wherein said second means, upon converting said instruction into said power unit control signal, transmits said power unit control signal to said first power supply unit to perform on and off control of said device.

* * * * *